United States Patent [19]

Durrant

[11] Patent Number: 5,548,253

[45] Date of Patent: Aug. 20, 1996

[54] SPECTRALLY EFFICIENT QUADRATURE AMPLITUDE MODULATOR

[75] Inventor: Randolph L. Durrant, Colorado Springs, Colo.

[73] Assignee: Omnipoint Corporation, Colorado Springs, Colo.

[21] Appl. No.: 423,225

[22] Filed: Apr. 17, 1995

[51] Int. Cl.[6] ............................. H03C 3/00; H04L 27/20
[52] U.S. Cl. ........................ 332/103; 332/104; 375/296; 375/298; 375/308
[58] Field of Search ............................. 332/103, 104, 332/105; 375/200, 201, 261, 279, 280, 281, 282, 283, 284, 285, 296, 298, 308

[56] References Cited

U.S. PATENT DOCUMENTS

| | | | |
|---|---|---|---|
| 4,100,498 | 7/1978 | Alsup et al. | 328/14 |
| 4,163,944 | 8/1979 | Chambers et al. | 325/446 |
| 4,247,942 | 1/1981 | Hauer | 375/25 |
| 4,324,001 | 4/1982 | Rhodes | 375/90 |
| 4,338,579 | 7/1982 | Rhodes | 332/21 |
| 4,339,724 | 7/1982 | Feher | 328/164 |
| 4,355,399 | 10/1982 | Timor | 375/1 |
| 4,479,227 | 10/1987 | Bjornholt | 375/1 |
| 4,481,640 | 11/1984 | Chow et al. | 375/1 |
| 4,567,602 | 1/1986 | Kato et al. | 375/60 |
| 4,587,662 | 5/1986 | Langewell | 375/1 |
| 4,606,039 | 8/1986 | Nicolas et al. | 375/1 |
| 4,616,229 | 10/1986 | Taylor | 342/171 |
| 4,644,565 | 2/1987 | Seo et al. | 375/60 |
| 4,707,839 | 11/1987 | Andren et al. | 375/1 |
| 4,745,628 | 5/1988 | McDavid et al. | 375/261 |
| 4,984,247 | 1/1991 | Kaufman et al. | 375/1 |
| 5,025,452 | 6/1991 | Sohner et al. | 375/1 |
| 5,093,637 | 3/1992 | Isota et al. | 332/103 |
| 5,191,597 | 3/1993 | Ekelund et al. | 375/298 |
| 5,353,303 | 10/1994 | Walthall | 375/1 |
| 5,383,219 | 1/1995 | Wheatley et al. | 375/1 |
| 5,414,728 | 5/1995 | Zehavi | 375/200 |
| 5,414,796 | 5/1995 | Jacobs et al. | 395/2.3 |

FOREIGN PATENT DOCUMENTS

| | | |
|---|---|---|
| 9512938 | 5/1995 | WIPO. |
| 9512943 | 5/1995 | WIPO. |

OTHER PUBLICATIONS

Feher, Kamilo *Filtering and Limiting Effects on the Performance of QPSK, OKQPSK, MSK, and Feher's QPSK*, Digital Communications Satellite/Earth Station Engineering (Prentice–Hall 1983), pp. 196–200.

Kavehrad, M. and P. J. McLane, *Performance of Low–Complexity Channel Coding and Diversity for Spread Spectrum in Indoor, Wireless Communication*, AT&T Technical Journal, vol. 64, No. 8, Oct. 1985, pp. 1927–1965.

Patrick S. K. Leung, et al., *F–QPSK–A Superior Modulation Technique for Mobile and Personal Communications*, IEEE Transactions on Communications, vol. 39, Jun. 1993, pp. 288–294

Saleh, Adel A. M., et al., *An Experimental TDMA Indoor Radio Communications System Using Slow Frequency Hopping and Coding*, IEEE Transactions on Communications, Jan. 1991, vol. 39, No. 1, pp. 152–161.

Amoroso, Frank, et al., *Simplified MSK Signaling Technique*, IEEE Transactions on Communications, Apr. 1977, pp. 433–441.

(List continued on next page.)

*Primary Examiner*—David Mis
*Attorney, Agent, or Firm*—Lyon & Lyon

[57] ABSTRACT

A spectrally efficient quadrature amplitude modulator comprising means for providing in-phase (I) and quadrature-phase shifted (Q) bit-streams from an input serial bit-stream, means for selectively suppressing the amplitudes of bits in the I and Q bit-streams in response to transition conditions for the I and Q signals, individual bit-shaping functions for the I and Q signals, and means for quadrature modulating a carrier signal with the I and Q signals. The resultant modulated carrier signal exhibits improved bandwidth efficiency and other desirable power spectral properties, including reduced spectral regrowth after amplitude limiting.

20 Claims, 15 Drawing Sheets

OTHER PUBLICATIONS

Austin, Mark C., et al., *Quadrature Overlapped Raised-Cosine Modulation,* IEEE Transactions on Communications, vol. Com-29, No. 3, Mar. 1981, pp. 237-249.

Murota, Kazuaki, et al., *GMSK Modulation for Digital Mobile Radio Telephony,* IEEE Transactions on Communications, vol. Com-29, No. 7, Jul. 1981, pp. 1044-1050.

Seo, J. S., et al., *SQAM: A New Superposed QAM Modem Technique,* IEEE Transactions on Communications, vol. Com-33, Mar. 1985, pp. 296-300.

Taylor, John W., Jr., et al., *Quadriphase Code-A Radar Pulse Compression Signal With Unique Characteristics,* IEEE Transactions on Aerospace and Electronic Systems, vol. 24, No. 2, Mar. 1988, pp. 156-170.

Ziemer, Rodger, et al., *Conversion and Matched Filter Approximations for Serial Minimun-Shift Keyed Modulation,* IEEE Transactions on Communications, vol. Com. 30, No. 3, Mar. 1982, pp. 495-509.

Unkauf, Manfred G., *Surface Wave Devices in Spread Spectrum Systems,* Surface Wave Filters (Wiley 1977), pp. 477-509.

Mark C. Austin, et al. *QPSK, Staggered QPSK, and MSK-A Comparative Evaluation,* IEEE Transactions On Communications, vol. Com-31, No. 2, Feb. 1983, pp. 171-182.

Gerhard Ritter, JTC (air)/94.02.07 *Response to Proposal for FQPSK Modulation in DCS1900,* Feb. 7, 1994, pp. 1-4.

Dr. Kamilo Feher, JTC (Air)/94.02.07 *JTC Modulation Standard Group-FQPSK Consortium Spectrum Utilization with Compatible/Expandable GMSK, QPSK and FQPSK,* Feb. 1994, pp. 1-16.

Shuzo Kato, et al., *XPSK: A New Cross-Correlated Phase-Shift Keying Modulation Technique,* IEEE Transactions On Communications, vol. Com-31, No. 5, May 1983, pp. 701-707.

K. S. Chung, et al., IEEE ICASSP *Generalized Tamed Frequency Modulation,* 1982, pp. 1805-1808.

Frank de Jager, et al., *Tamed Frequency Modulation, A Novel Method to Achieve Spectrum Economy in Digital Transmission,* IEEE Transactions On Communications, vol. Com-26, No. 5, May 1978, pp. 534-541.

Cohen, Marvin N., Marshall R. Fox, and J. Michael Baden, *Minimum Peak Sidelobe Pulse Compression Codes,* IEEE International Radar Conference, 1990, pp. 633-638.

Campbell, Colin K., *Applications of Surface Acoustic and Shallow Bulk Acoustic Wave Devices,* Proceedings of the IEEE, Oct. 1989, pp. 1453-1484.

Nanayakkara, S., *High Speed Receiver Designs Based on Surface Acoustic Wave Devices,* Sixth International Conference on Digital Satellite Communications, Sep. 1983, pp. 16-22.

Anderson, John B., et al., *Digital Phase Modulation,* (Plenum Press, 1986), pp. 22-26, 50-53, 211-235, 237-271.

SPECTRALLY EFFICIENT QUADRATURE AMPLITUDE MODULATOR

BACKGROUND OF THE INVENTION

1) Field of the Invention

This invention pertains to the field of communications and, more particularly, a method and apparatus for processing and modulating digital signals.

2) Background of the Related Art

Typically, in digital communication systems, a digital bit-stream is modulated onto one or more carrier signals for transmission over a communication channel. In some applications, such as certain radiofrequency (RF) communication systems, the modulated signal is passed through a high power amplifier (HPA) before transmission. At the receiver, the signal is filtered, demodulated, and detected as a digital bit-stream.

In many digital communications systems, power efficiency is of great importance. Examples of such systems include certain satellite communications, cellular telephone, mobile and portable radio systems. In such systems, improved power efficiency typically is achieved by operating the HPA nonlinearly at some level of amplitude limiting or saturation.

Maintaining data integrity is another important aspect for digital communication systems. Conventional quadra-phase modulation techniques such as quadrature phase shift keying (QPSK) are widely used in digital communication systems because of, among other things, the desirable error rate performance of systems employing these techniques. In accordance with these techniques, a digital bit-stream is first divided into two bit-streams; an in-phase (I) bit-stream and a quadrature-phase shifted (Q) bit-stream. Carrier signals (typically sine waves) for the I and Q bit-streams are also generated. The I and Q carrier signals are generally synchronous and frequency coherent, but shifted 90 degrees in phase with respect to each other. The I and Q bit-streams modulate the phase of the I and Q sinusoidal carrier signals, respectively. The modulated I and Q carrier signals are then combined to form a composite QPSK signal.

Conventional quadra-phase modulation techniques suffer from certain drawbacks. For example, composite QPSK signals have spectral waveforms which include a relatively large amount of energy in spectral sidelobes, which is undesirable. This undesired spectral sidelobe energy can cause interchannel and/or out-of-band interference resulting in degraded bit error rate performance in a communication system.

Post-modulation filtering has been used to reduce this undesired spectral sidelobe energy. Such filtering is generally impractical, however, after the high power amplifier (HPA). Thus, instead, the QPSK modulated signal is usually filtered before being passed through the HPA.

This type of preamplification filtering of the QPSK modulated signal has its drawbacks. For example, after filtering, the modulated signal can exhibit substantial variation in the amplitude envelope. Thus, when the signal is passed through an amplitude limited or saturated HPA, the signal's spectrum can exhibit substantial sidelobe regrowth or spreading due to amplitude modulation (AM) to phase modulation (PM) conversion.

Modulation techniques have been developed in an attempt to address these problems, particularly that of spectral regrowth. Among these techniques are minimum shift keying (MSK), Gaussian Filtered MSK (GMSK), quadrature overlapped raised cosine (QORC) modulation, and superposed quadrature amplitude modulation (SQAM). These techniques generally incorporate premodulation baseband filtering of the digital bit-stream to reduce spectral sidelobe energy in the modulated signal by smoothing phase transitions between adjacent bit intervals.

Other and further details regarding these and similar previous modulation techniques can be found, for example, in M. Austin, et. al., "QPSK, Staggered QPSK, and MSK—A Comparative Evaluation," *IEEE Transactions on Communications*, Vol. COM-31, No. 2, pp. 171–182 (1983); M. Austin and M. Chang, "Quadrature Overlapped Raised-Cosine Modulation," *IEEE Transactions on Communications*, Vol. COM-29, No. 3, pp. 237–249 (1981); J. Soo and K. Feher, "SQAM: A New Superposed QAM Modem Technique," *IEEE Transactions on Communications*, Vol. COM-33, No. 3, pp. 296–300 (1985); S. Kato and K. Feher, "XPSK: A New Cross-Correlated Phase-Shift Keying Modulation Technique," *IEEE Transactions on Communications*, Vol. COM-31, No. 5, pp. 701–707 (1983); and K. Murata and K. Hirode, "GMSK Modulation for Digital Mobile Radio Telephony," *IEEE Transactions on Communications*, Vol. COM-29, No. 7, pp. 1044–1050 (1981).

Accordingly, it would be advantageous to provide a technique for modulating digital signals which produces spectrally efficient waveforms having reduced spectral sidelobe energy, and exhibiting reduced spectral regrowth when passed through a nonlinear, amplitude limited channel, such as a saturated or hard-limited HPA.

It would further be advantageous to provide such a technique well adapted to the transmission of spread spectrum signals.

SUMMARY OF THE INVENTION

The present invention comprises a system and method for baseband processing and modulation of digital signals to achieve modulated signals with spectrally efficient waveforms.

In one aspect of the invention, bit-shaping functions are applied to in-phase (I) and quadrature-phase shifted (Q) bit-streams to smooth bit edge transitions, reducing spectral sidelobe energy in the resulting modulated waveforms.

In another aspect of the invention, when adjacent bits of a bit-stream having opposite polarity cross zero, the bits are passed through a baseband signal processor which allows the zero crossings to occur in time according to a baseband bit-shaping function.

In another aspect of the invention, a baseband signal processor generates bit transition waveforms for all of the bits in the I and Q bit-streams corresponding to each bit's current transition state (i.e., 0→0, 0→1, 1→0, or 1→1). The processor preferably stores a set of digital representations of predesigned bit transition waveforms for I and Q bit-streams in addressable memory. The bit transition states of the Q bit-stream are used to select a bit transition waveform from the set to create a new I bit-stream. Likewise, bit transition states of the I bit-stream are used to select a bit transition waveform to create a new Q bit-stream from the same set. These new bit transmission waveforms are selected to produce a spectrally efficient quadrature amplitude modulated (SEQAM) signal whose spectrum exhibits reduced spectral sidelobe regrowth when passed through a nonlinear or amplitude limited channel.

In another aspect of the invention, a communication system utilizing spread spectrum techniques incorporates a baseband signal processor and quadra-phase modulator for communication using spectrally efficient modulated waveforms.

In another aspect of the invention, portable, mobile, and base station transceivers operating in a cellular radio system incorporate a baseband signal processor and quadra-phase modulator for communicating with spectrally efficient modulated waveforms.

DESCRIPTION OF THE PREFERRED EMBODIMENT

Figure 1:
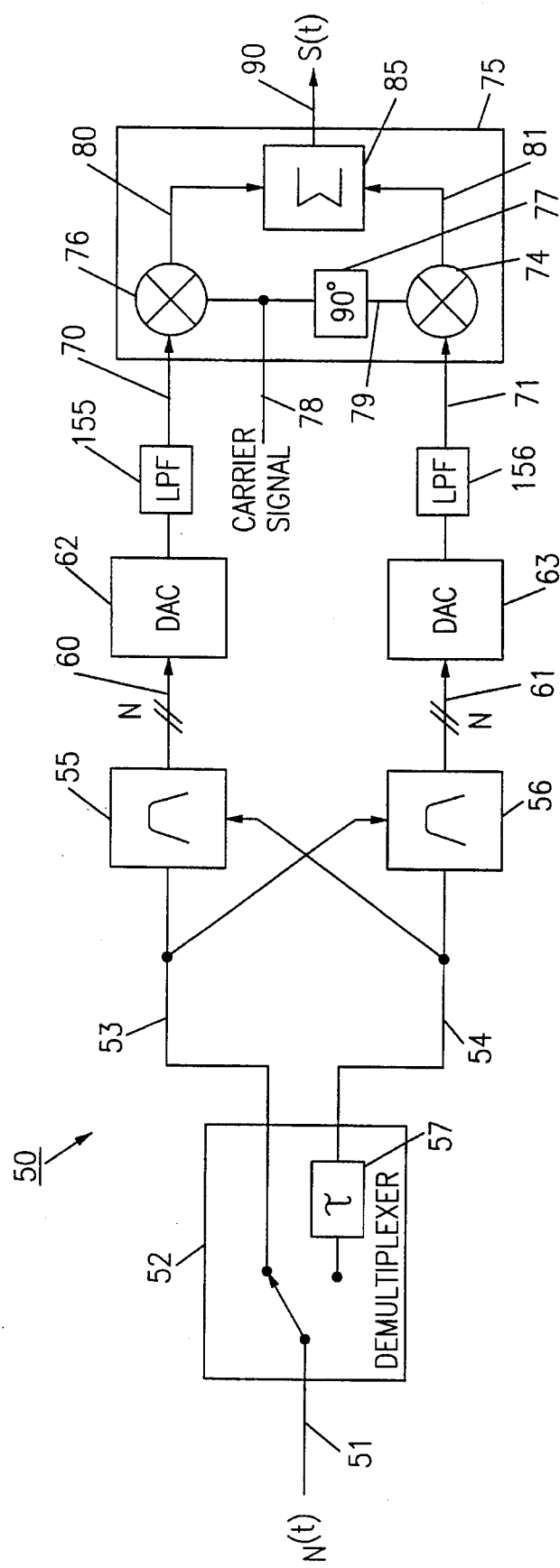
FIG. 1 is a functional block diagram of a spectrally efficient quadrature amplitude modulator in accordance with one or more aspects of the present invention.

A preferred spectrally efficient quadrature amplitude modulator 50 is shown in FIG. 1. A serial bit-stream $x_N(t)$ 51 is received by a digital demultiplexer 52. The serial bit-stream $x_N(t)$ 51, which includes the information desired to be transmitted, comprises a series of bits each having a time interval, or period, $T_b/2$, such that the bit rate is $2/T_b$. The demultiplexer divides the serial bit-stream $x_N(t)$ 51 into an I bit-stream 53 and a Q bit-stream 54. Each bit in the I bit-stream 53 and Q bit-stream 54 has a time interval, or period, $T_b$. As shown in FIG. 1, demultiplexer 52 delays the relative timing of the Q bit-stream 54 with respect to the I bit-stream 53 by an amount τ 57. In the preferred embodiment, τ equals $T_b/2$.

In each of the I and Q bit-streams 53 and 54, four transition states from one bit to the next are possible as characterized by the value of the previous bit and the value of the following bit; 0→0, 0→1, 1→0, and 1→1.

The I bit-stream 53 is passed to an I waveform generator 55 and a Q waveform generator 56. I Waveform generator 55 uses the current transition state of the I bit-stream 53 along with the preceding and succeeding transition states of the Q bit-stream 54 to select a digital-I signal 60 representing one of the predesigned bit transition waveforms stored in the waveform generator look-up table for the I bit-stream as further explained herein. The predesigned bit transition waveforms comprise a set of m waveforms designed to produce a quadra-phase modulated signal S(t) 90 with a spectrally efficient waveform.

The digital-I signal 60 is n-bits wide, preferably 8 bits, and is transmitted to digital-to-analog converter (DAC) 62. DAC 62 converts the digital-I signal 60 into an analog signal which is passed through a low pass filter 155 to produce the analog I component I(t) 70 of the analog SEQAM signal S(t) 90.

Similarly, the Q bit-stream 54 is passed through a Q waveform generator 56 and also input to the I-waveform generator 55. Waveform generator 56 uses the current transition state of the Q bit-stream along with the preceding and succeeding transition states of the I bit-stream to select a digital-Q signal 61 representing one of the predesigned bit transition waveforms stored in the waveform generator look-up table for the Q bit-stream.

In a preferred embodiment, the waveform generator look-up table comprises an addressable memory device, such as preferably a ROM, or an electrically erasable programmable read only memory (EEPROM) or EPROM or other memory.

The digital-Q signal 61 is m-bits wide, preferably 8 bits, and is transmitted to DAC 63. DAC 63 converts the digital-Q signal 61 into an analog signal which is passed through a low pass filter 156 to produce the analog Q component Q(t) 71 of the analog SEQAM signal S(t) 90.

In a preferred embodiment, signals I(t) 70 and Q(t) 71 are provided to a quadra-phase modulator 75. The I(t) signal 70 is provided to a multiplier 76 which modulates an I-carrier signal 78 to produce an in-phase modulated carrier signal $S_I(t)$ 80. For example, I-carrier signal 78 may comprise a sinusoidal signal $\cos(w_o t)$. I-carrier signal 78 is preferably provided to a 90 degree phase shifter 77 which produces a Q-carrier signal 79 in quadrature with I-carrier signal 78. For example, Q-carrier signal 79 may comprise a sinusoidal signal $\sin(w_o t)$.

In a similar manner, Q(t) 71 is provided to a second multiplier 74 which modulates the Q-carrier signal 79 to produce a quadrature modulated carrier signal $S_Q(t)$ 81. A power combiner 85 additively combines $S_I(t)$ 80 and $S_Q(t)$ 81 to produce a spectrally efficient quadrature amplitude modulated signal S(t) 90.

Figure 2:
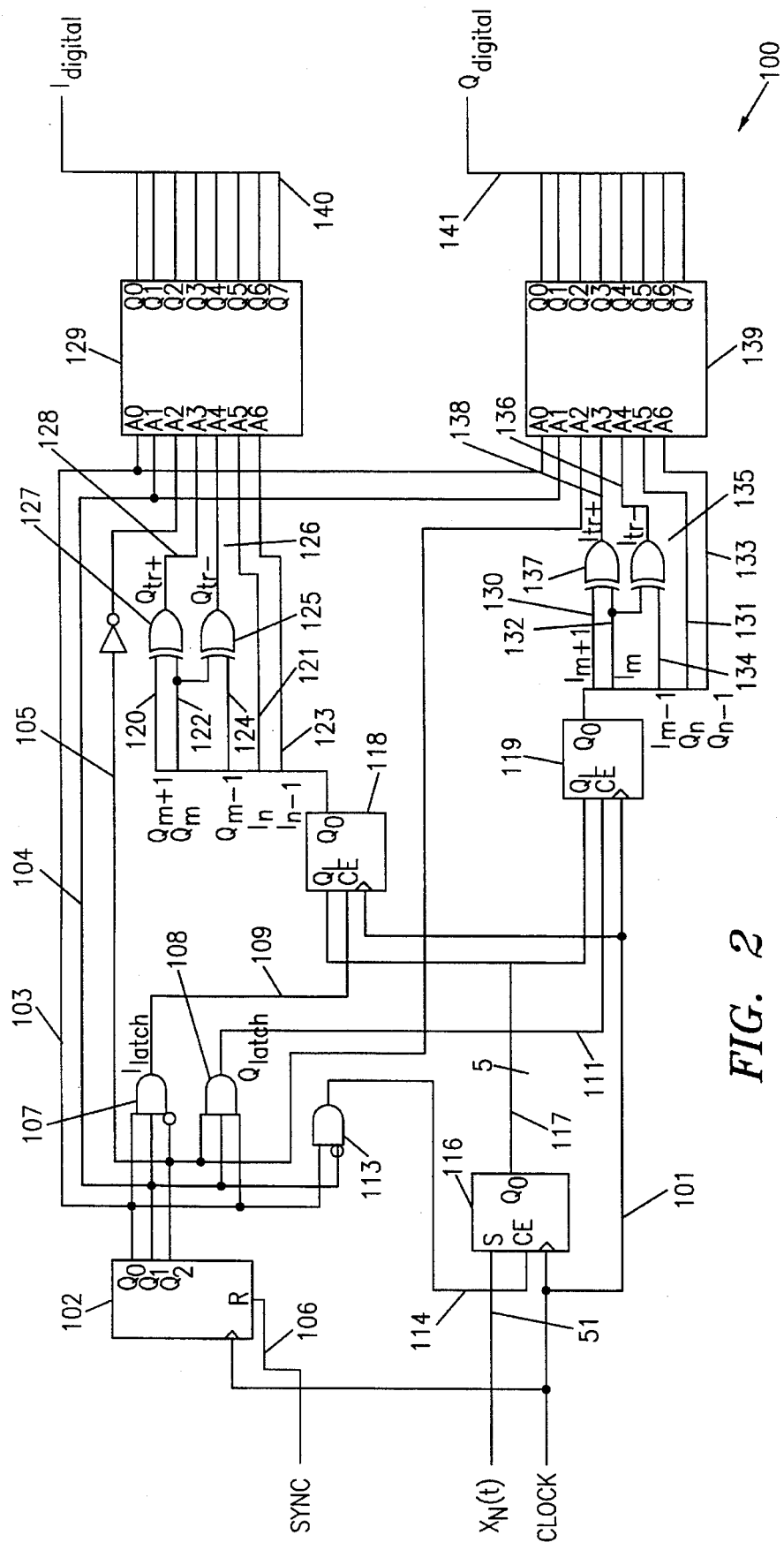
FIG. 2 is a schematic diagram of a preferred digital circuit embodiment of a digital signal processor for in-phase (I) and quadrature-phase shifted (Q) signals.

FIG. 2 is a schematic diagram of a preferred digital circuit embodiment of a digital signal processor 100 for generating I and Q signals in accordance with certain aspects of the present invention. Standard electrical symbology and terms are used in FIG. 2.

Figure 3A:
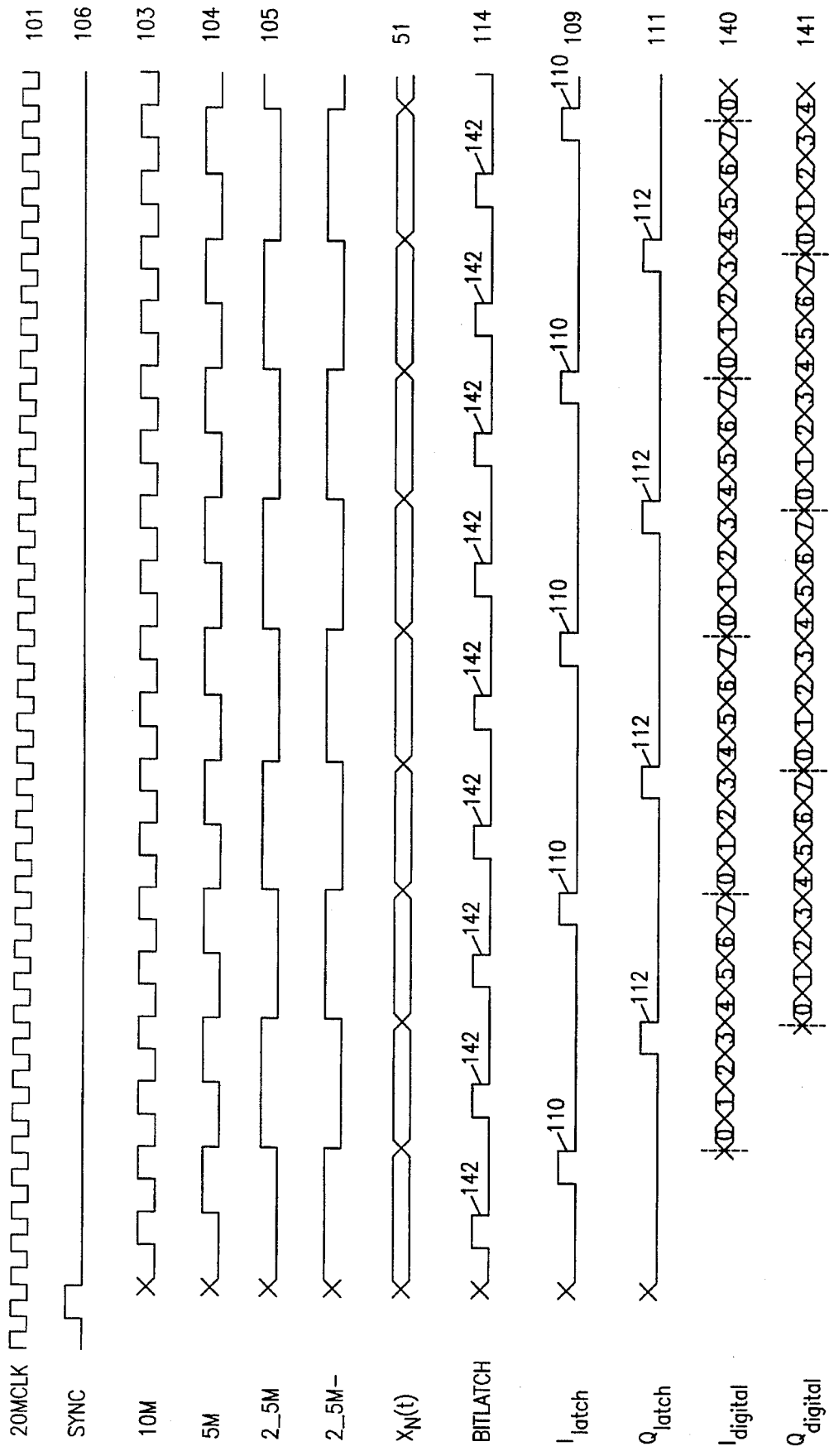
FIGS. 3A and 3B are waveform diagrams showing the relative timing of exemplary signals for the digital signal processor shown in FIG. 2.

In a preferred embodiment, a clock signal 101 is input to a digital counter 102. The frequency ($f_{clock}$) of the clock signal 101 is preferably 20 MHz which achieves a data rate of 5 MHz. The digital counter 102 generates a clock signal 103 with frequency $f_{clock}/2$, a clock signal 104 with frequency $f_{clock}/4$, and a clock signal 105 with frequency $f_{clock}/8$ from the clock signal 101. A sync signal 106 preferably resets the counter 102 before starting a data transmission to ensure a known phase relationship at the output signals 103, 104 and 105 as shown in FIG. 3A.

The clock signal 103, the clock signal 104, and the clock signal 105 are provided to logical AND gates 107 and 108. The polarity of the clock signal 105 is inverted at the input of AND gate 107, but not at the input of AND gate 108. AND gate 107 outputs an $I_{latch}$ signal 109. An exemplary $I_{latch}$ signal 109 is shown in FIG. 3A. The $I_{latch}$ signal 109 exhibits a positive $I_{latch}$ pulse 110 once every period of the clock signal 105. The $I_{latch}$ pulse 110 has a duration of one cycle of the clock signal 101.

AND gate 108 outputs a $Q_{latch}$ signal 111. An exemplary $Q_{latch}$ signal 111 is shown in FIG. 3A. The $Q_{latch}$ signal 111 exhibits a positive $Q_{latch}$ pulse 112 once every period of the clock signal 105. The $Q_{latch}$ pulse 112 has a duration of one cycle of the clock signal 101. The $I_{latch}$ pulses 110 and $Q_{latch}$ pulses 112 are preferably evenly staggered with respect to each other as shown in FIG. 3A.

The clock signal 103 and the clock signal 104 are the inputs to AND gate 113. The polarity of the clock signal 104 is inverted at the input of AND gate 113. AND gate 113 outputs a bitlatch signal 114. An exemplary bitlatch signal 114 is shown in FIG. 3A.

Figure 3B:
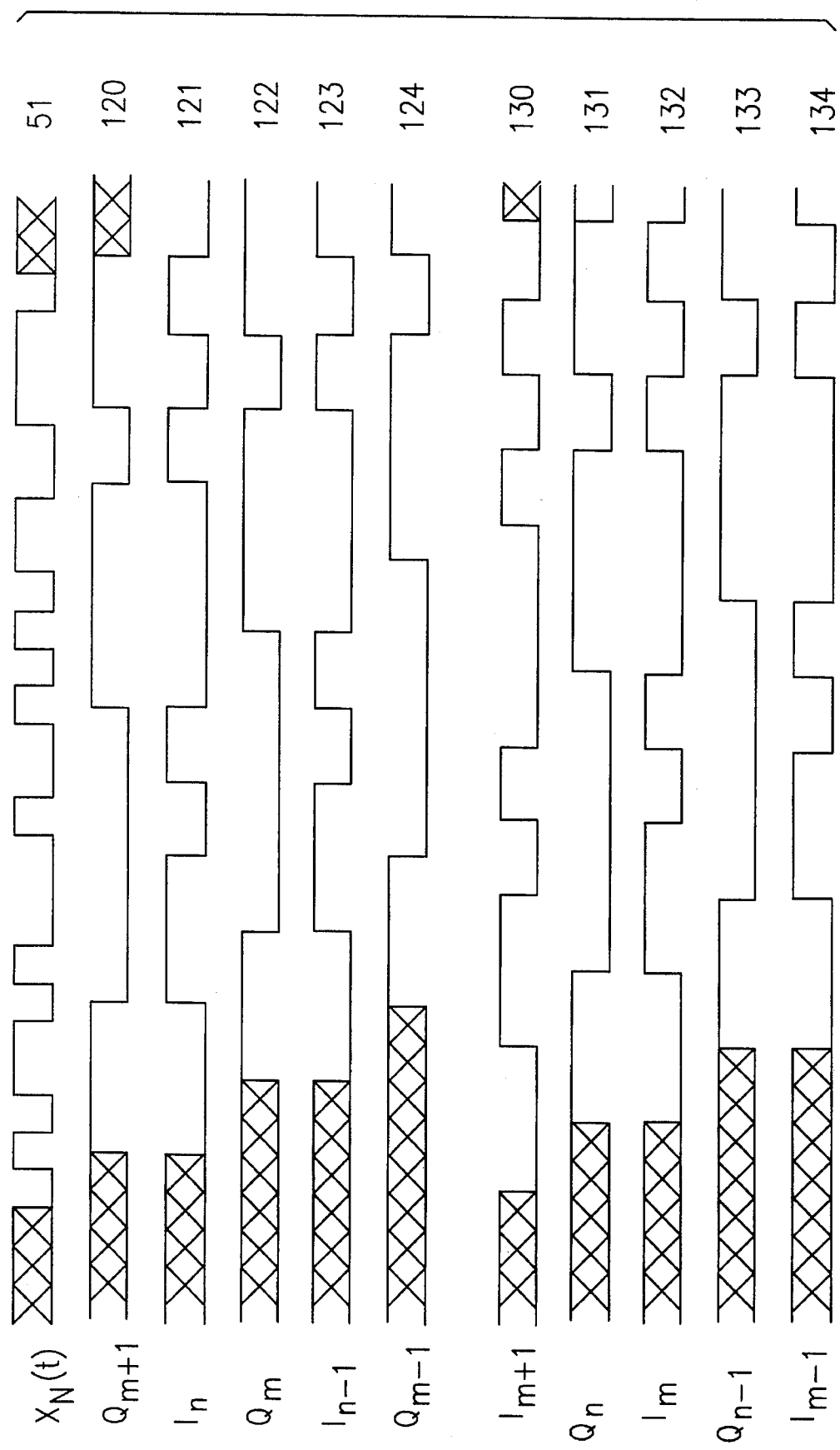

A serial bit-stream signal $x_N(t)$ 51 is received by a latching serial-to-parallel converter 116. An exemplary bit-stream signal $x_N(t)$ 51 is shown in FIG. 3B. The serial bit-stream signal $x_N(t)$ 51 is clocked into the latching serial-to-parallel converter 116 by the 20 MHz clock signal 101. The output of the latching serial-to-parallel converter 116 is latched once every period of the clock signal 104 by bitlatch pulses 142 in bitlatch signal 114 as shown in FIG. 3A. The converter 116 produces a multi-line parallel word signal 117. In a preferred embodiment, the signal 117 comprises 5 lines in parallel.

The signal 117 is provided to latch 118. Latch 118 is enabled during each positive $I_{latch}$ pulse 110. Latch 118 produces a $Q_{m+1}$ output signal 120, an $I_n$ output signal 121, a $Q_m$ output signal 122, an $I_{n-1}$ output signal 123, and a $Q_{m-1}$ output signal 124. At any point in time, the $I_{n-1}$ signal 123 represents the most recent preceding bit of the $I_n$ signal 121. Similarly, at any point in time, the $Q_{m+1}$ 120 signal represents the next succeeding bit of the $Q_m$ signal 122, and $Q_{m-1}$ 124 represents the most recent preceding bit of the $Q_m$ signal 122. FIG. 3B shows an example serial bit-stream signal $x_N(t)$ 51 and the resulting exemplary signals $Q_{m+1}$ 120, $I_n$ 121, $Q_m$ 122, $I_{n-1}$ 123, and $Q_{m-1}$ 124.

The $Q_{m-1}$ signal 124 and $Q_m$ signal 122 are provided to an XOR gate 125. The XOR gate 125 performs a logical "EXCLUSIVE-OR" function on the present and most recent preceding bits of the $Q_m$ signal 122. The XOR gate 125 produces an output signal $Q_{tr-}$ 126. The $Q_{tr-}$ signal 126 will have a value of 0 whenever the present and most recent preceding bits of the $Q_m$ signal 122 have the same value (i.e., $Q_m = Q_{m-1} \rightarrow$ "no transition"), and it will have a value of 1 whenever the present and most recent preceding bits of the $Q_m$ signal 122 have different values (i.e., $Q_m \neq Q_{m-1} \rightarrow$ "transition"). Thus the $Q_{tr-}$ signal 126 represents the most recent previous transition state for the $Q_m$ signal 122.

Similarly, the $Q_m$ 122 signal and $Q_{m+1}$ signal 120 are provided to an XOR gate 127. The XOR gate 127 performs a logical "EXCLUSIVE-OR" function on the present and next succeeding bits of the $Q_m$ signal 122. The XOR gate 127 produces an output signal $Q_{tr+}$ 128. The $Q_{tr+}$ signal 128 will have a value of 0 whenever the present and next succeeding bits of the $Q_m$ signal 122 have the same value (i.e., $Q_{m+1} = Q_m \rightarrow$ "no transition"), and it will have a value of 1 whenever the present and next succeeding bits of the $Q_m$ signal 122 have different values (i.e., $Q_{m+1} \neq Q_m \rightarrow$ "transition"). Thus the $Q_{tr+}$ signal 128 represents the next succeeding transition state upcoming for the $Q_m$ signal 122.

The signal 117 also is provided to latch 119. Latch 119 is enabled during each positive $Q_{latch}$ pulse 112. Latch 118 produces an $I_{m+1}$ output signal 130, a $Q_n$ output signal 131, an $I_m$ output signal 132, a $Q_{n-1}$ output signal 1323, and an $I_{m-1}$ output signal 134. At any point in time, the $Q_{n-1}$ signal 133 represents the most recent preceding bit of the $Q_n$ signal 131. Similarly, at any point in time, the $I_{m+1}$ 130 signal represents the next succeeding bit of the $I_m$ signal 132, and $I_{m-1}$ 134 represents the most recent preceding bit of the $I_m$ signal 132. FIG. 3B shows an example serial bit-stream signal $x_N(t)$ 51 and the resulting exemplary signals $I_{m+1}$ 130, $Q_n$ 131, $I_m$ 132, $Q_{n-1}$ 133, and $I_{m-1}$ 134.

The $I_{m-1}$ signal 134 and $I_m$ signal 132 are provided to an XOR gate 135. The XOR gate 135 performs a logical "EXCLUSIVE-OR" function on the present and most recent preceding bits of the $I_m$ signal 132. The XOR gate 135 produces an output signal $I_{tr-}$ 136. The $I_{tr-}$ signal 136 will have a value of 0 whenever the present and most recent preceding bits in the $I_m$ signal 132 have the same value (i.e., $I_m = I_{m-1} \rightarrow$ "no transition"), and it will have a value of 1 whenever the present and most recent preceding bits of the $I_m$ signal 132 have different values (i.e., $I_m \neq I_{m-1} \rightarrow$ "transition"). Thus the $I_{tr-}$ signal 136 represents the most recent previous transition state for the $I_m$ signal 132.

Similarly, the $I_m$ 132 signal and $I_{m+1}$ signal 130 are provided to an XOR gate 137. The XOR gate 137 performs a logical "EXCLUSIVE-OR" function on the present and next succeeding bits of the $I_m$ signal 132. The XOR gate 137 produces an output signal $I_{tr+}$ 138. The $I_{tr+}$ signal 138 will have a value of 0 whenever the present and next succeeding bits in the $I_m$ signal 132 have the same value (i.e., $I_{m+1} = I_m \rightarrow$ "no transition"), and it will have a value of 1 whenever the present and next succeeding bits of the $I_m$ signal 132 have different values (i.e., $I_{m+1} \neq I_m \rightarrow$ "transition"). Thus the $I_{tr+}$ signal 138 represents the most recent previous transition state for the $I_m$ signal 132.

The $I_{n-1}$ signal 123, $I_n$ signal 121, $Q_{tr-}$ signal 126, and $Q_{tr+}$ signal 128 together represent 16 possible transition conditions as shown in Table 1. These four signals are updated by the $I_{match}$ signal 109 in response to each bit of the $I_n$ signal 121 to be transmitted. Together, these four signals provide the four most significant bits (MSBs) for addressing I-ROM 129. I-ROM 129 maps the 16 transition conditions into digital representations of 16 predesigned bit transition waveforms. I-ROM 129 may be an addressable memory device such as an EEPROM or μVPROM.

Likewise, the $Q_{-1}$ signal 133, $Q_n$ signal 131, $I_{tr-}$ signal 136 and $I_{tr+}$ signal 138 together represent 16 possible transition conditions as shown in Table 2. These four signals are updated by the $Q_{match}$ signal 111 in response to each bit of the $Q_n$ signal 131 to be transmitted. These four signals together provide the four MSBs for addressing Q-ROM 139. Q-ROM 139 maps the 16 transition conditions into digital representations of 16 predesigned bit transition waveforms. Q-ROM 139 may be an addressable memory device such as an EEPROM or μVPROM.

TABLE 1

| $I_{n-1}$ | $I_n$ | $Q_{tr-}$ | $Q_{tr+}$ |
|---|---|---|---|
| 0 | 0 | 0 (No Transition) | 0 (No Transition) |
| 0 | 0 | 0 (No Transition) | 1 (Transition) |
| 0 | 0 | 1 (Transition) | 0 (No Transition) |
| 0 | 0 | 1 (Transition) | 1 (Transition) |
| 0 | 1 | 0 (No Transition) | 0 (No Transition) |
| 0 | 1 | 0 (No Transition) | 1 (Transition) |
| 0 | 1 | 1 (Transition) | 0 (No Transition) |
| 0 | 1 | 1 (Transition) | 1 (Transition) |
| 1 | 0 | 0 (No Transition) | 0 (No Transition) |
| 1 | 0 | 0 (No Transition) | 1 (Transition) |
| 1 | 0 | 1 (Transition) | 0 (No Transition) |
| 1 | 0 | 1 (Transition) | 1 (Transition) |
| 1 | 1 | 0 (No Transition) | 0 (No Transition) |
| 1 | 1 | 0 (No Transition) | 1 (Transition) |
| 1 | 1 | 1 (Transition) | 0 (No Transition) |
| 1 | 1 | 1 (Transition) | 1 (Transition) |

TABLE 2

| $Q_{n-1}$ | $Q_n$ | $I_{tr-}$ | $I_{tr+}$ |
|---|---|---|---|
| 0 | 0 | 0 (No Transition) | 0 (No Transition) |
| 0 | 0 | 0 (No Transition) | 1 (Transition) |
| 0 | 0 | 1 (Transition) | 0 (No Transition) |
| 0 | 0 | 1 (Transition) | 1 (Transition) |
| 0 | 1 | 0 (No Transition) | 0 (No Transition) |
| 0 | 1 | 0 (No Transition) | 1 (Transition) |
| 0 | 1 | 1 (Transition) | 0 (No Transition) |
| 0 | 1 | 1 (Transition) | 1 (Transition) |
| 1 | 0 | 0 (No Transition) | 0 (No Transition) |
| 1 | 0 | 0 (No Transition) | 1 (Transition) |
| 1 | 0 | 1 (Transition) | 0 (No Transition) |
| 1 | 0 | 1 (Transition) | 1 (Transition) |
| 1 | 1 | 0 (No Transition) | 0 (No Transition) |
| 1 | 1 | 0 (No Transition) | 1 (Transition) |
| 1 | 1 | 1 (Transition) | 0 (No Transition) |
| 1 | 1 | 1 (Transition) | 1 (Transition) |

The three least significant address bits of I-ROM 129 are provided by the clock signals 103, 104 and 105 as shown in FIG. 2. In response to these clock signals, an I-ROM 129 output signal $I_{digital}$ 140 sequences through a pattern of eight n-bit digital words selected by the $I_{n-1}$ signal 123, $I_n$ signal 121, $Q_{tr-}$ signal 126, and $Q_{tr+}$ signal 128. The $I_{digital}$ signal 140 comprises a digital representation of the time-varying amplitude of a predesigned bit transition waveform to be produced for the $I_n$ signal at any point in time. In a preferred embodiment, n is eight, such that a digital word "FF" represents a positive peak amplitude in the $I_n$ signal 121, a "00" represents a negative peak amplitude in the $I_n$ signal 121.

Thus, each sequence of eight digital words represents the predesigned bit transition waveform for the $I_n$ signal selected by the $I_{-1}$ signal 123, $I_n$ signal 121, $Q_{tr-}$ signal 126 and $Q_{tr+}$ signal 128. Each sequence represents the time-varying amplitude value for the last half of one bit of the $I_n$ signal, and the first half of the succeeding bit of the $I_n$ signal. Thus the eight digital words produce a waveform for one complete bit period of the $I_n$ signal 121.

Similarly, the three least significant address bits of Q-ROM 139 are provided by the clock signals 103, 104 and 105 as shown in FIG. 2 In response to these clock signals, the Q-ROM 139 output signal $Q_{digital}$ 141 sequences through a pattern of eight N-bit digital words selected by the $Q_{n-1}$ signal 133, $Q_n$ signal 131, $I_{tr-}$ signal 136 and $I_{tr+}$ signal 138. The $Q_{digital}$ signal 141 comprises a digital representation of the time-varying amplitude of the $Q_n$ signal 131 at any point in time. In a preferred embodiment, n is eight, such that a digital word "FF" represents a positive peak amplitude in the $Q_n$ signal 131, a "00" represents a negative peak amplitude in the $Q_n$ signal 131.

Thus, each sequence of eight digital words represents the predesigned bit transition waveform for the $I_n$ signal selected by the $Q_{n-1}$ signal 133, $Q_n$ signal 131, $I_{tr-}$ signal 136 and $I_{tr+}$ signal 138. Each sequence represents the time-varying amplitude value for the last half of one bit of the $Q_n$ signal, and the first half of the succeeding bit of the $Q_n$ signal. Thus the eight digital words produce a waveform for one complete bit period of the $Q_n$ signal 133.

More specifically, in a preferred embodiment, the digital representations of predesigned bit transition waveforms stored in I-ROM 129 are generally designed to suppress the peak amplitude of a bit in the $I_n$ signal 121 from a normalized value of 1 to a value of β whenever the value of the preceding and succeeding bits in the $Q_n$ signal 131 are the same as each other, and to not suppress the peak amplitude of a bit in the $I_n$ signal 121 whenever the value of the preceding and succeeding bits in the $Q_n$ signal 131 are different.

In a preferred embodiment, the digital representations of predesigned bit transition waveforms stored in Q-ROM 139 are generally designed to suppress the peak amplitude of a bit in the $Q_n$ signal 131 from a normalized value of 1 to a value of β whenever the value of the preceding and succeeding bits in the $I_n$ signal 121 are the same as each other, and to not suppress the peak amplitude of a bit in the $Q_n$ signal 131 whenever the value of the preceding and succeeding bits in the $I_n$ signal 121 are different.

The general result of these design rules is to reduce variation in the amplitude envelope of the modulated signal.

Figure 4:
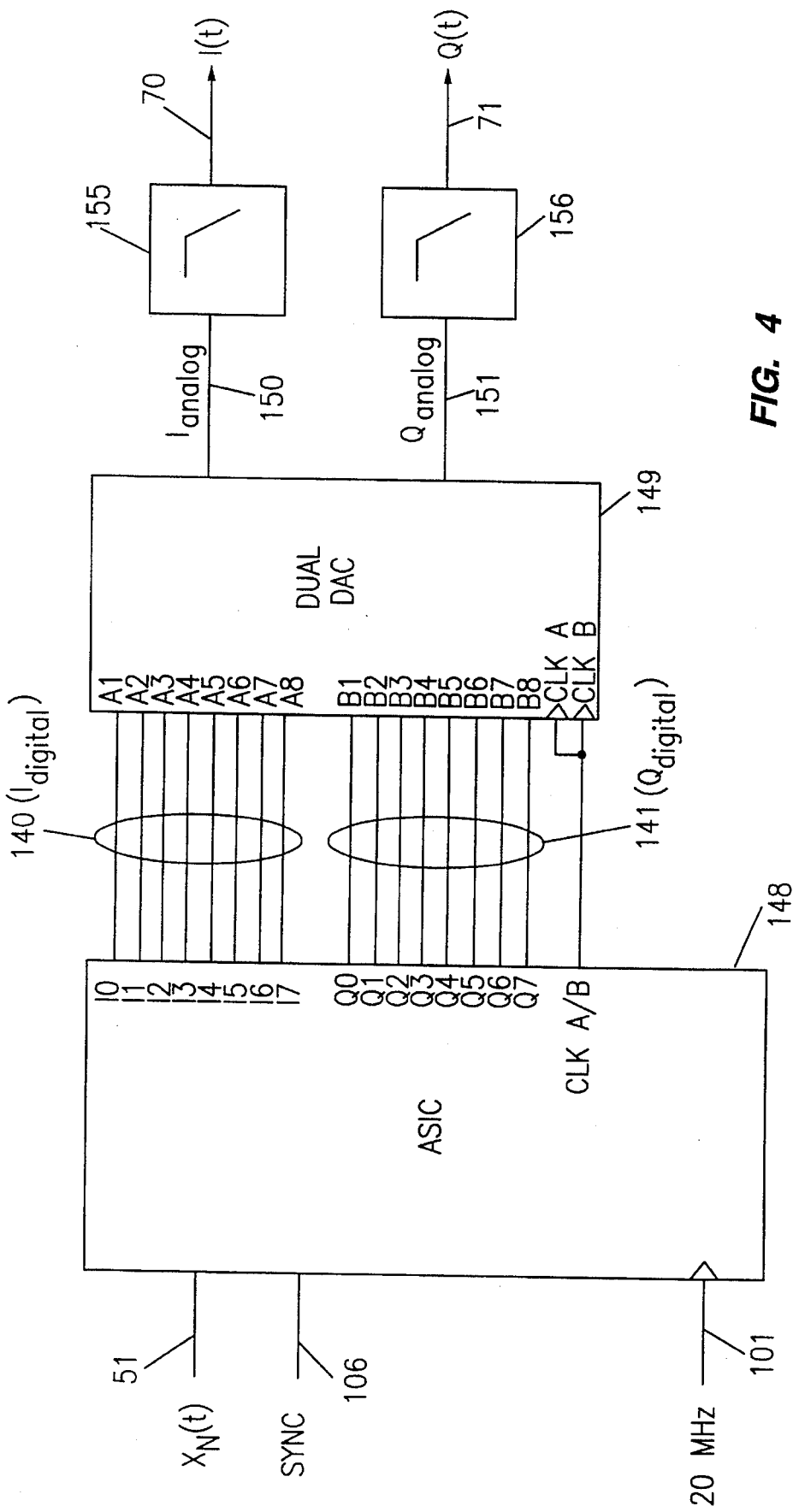
FIG. 4 is a schematic diagram of a preferred digital circuit embodiment of a baseband signal processor, incorporating an application specific integrated circuit (ASIC), for generating spectrally efficient quadrature amplitude modulated waveforms.

In a preferred embodiment, the digital signal processor 100 of FIG. 2 is incorporated in an application specific integrated circuit (ASIC), as shown in FIG. 4, which is a schematic diagram of a preferred digital circuit embodiment of a baseband signal processor 145. The serial bit-stream signal $x_N(t)$ 51, sync signal 106, and 20 MHz clock signal 101 are provided to an ASIC 148. The ASIC 148 incorporates the digital signal processor 100. In accordance with the description provided above, ASIC 148 provides output signals $I_{digital}$ 140 and $Q_{digital}$ 141.

In the preferred embodiment, the $I_{digital}$ signal 140 and the $Q_{digital}$ signal 141 are provided to a dual digital-to-analog converter (DAC) 149. Dual DAC 149 converts the n-bit digital words represented by $I_{digital}$ 140 and $Q_{digital}$ 141 into an analog output signal $I_{analog}$ 150 and an analog output signal $Q_{analog}$ 151 respectively. For example, DAC 149 converts an $I_{digital}$ word "FF" into an $I_{analog}$ signal having a normalized value of 1 volt. Likewise, DAC 149 converts an $I_{digital}$ word "00" into an $I_{analog}$ signal having a normalized value of −1 volt.

The $I_{analog}$ signal 150 and $Q_{analog}$ signal 151 are each passed through separate low pass filters 155 and 156 respectively, which substantially remove the clock frequency components of the $I_{analog}$ 150 and $Q_{analog}$ 151 signals to produce output signals I(t) 70 and Q(t) 71 respectively.

In a preferred embodiment, the signals I(t) 70 and Q(t) 71 are applied to a quadra-phase modulator 75 as shown in FIG. 1. Quadra-phase modulator 75 produces a spectrally efficient quadrature amplitude modulated signal S(t) 90.

Two embodiments using presently preferred pulse-shaping functions are described hereinafter. Other pulse-shape functions may be employed depending on the application.

In the first presently preferred embodiment, the I-ROM 129 and Q-ROM 139 each are programmed with the data listed in Table 3. A system embodiment incorporating this ROM so programmed produces bit transition waveforms derived from a double-interval raised cosine bit shape, for I(t) 70 and Q(t) 71, with $\beta=0.575$. This presently preferred double-interval raised cosine function, $p_1(t)$, is defined as:

$$p_1(t)=0.5*(1-\cos{(\pi t/T_b)}) \text{ for } 0 \leq t \leq 2T_b$$

TABLE 3

| Four MSBs (Transition conditions) | Three LSBs (clock signals) | | | | | | | |
|---|---|---|---|---|---|---|---|---|
| | 000 | 001 | 010 | 011 | 100 | 101 | 110 | 111 |
| 0000 | 36 | 36 | 36 | 36 | 36 | 36 | 36 | 36 |
| 0001 | 36 | 34 | 2E | 25 | 1B | 11 | 08 | 02 |
| 0010 | 00 | 02 | 08 | 11 | 1B | 25 | 2E | 34 |
| 0111 | 00 | 00 | 00 | 00 | 00 | 00 | 00 | 00 |
| 0100 | 36 | 3C | 4B | 63 | 7F | 9B | B3 | C2 |
| 0101 | 36 | 3E | 53 | 74 | 9A | C0 | C1 | F6 |
| 0110 | 00 | 08 | 1D | 3E | 64 | 8A | AB | C0 |
| 0111 | 00 | 0A | 25 | 4E | 7F | B0 | D9 | F4 |
| 1000 | C8 | C2 | B3 | 9B | 7F | 63 | 4B | 3C |
| 1001 | C8 | C0 | AB | 8A | 64 | 3E | 1D | 08 |
| 1010 | FE | F6 | E1 | C0 | 9A | 74 | 53 | 3E |
| 1011 | FE | F4 | D9 | B0 | 7F | 4E | 25 | 0A |
| 1100 | C8 | C8 | C8 | C8 | C8 | C8 | C8 | C8 |
| 1101 | C8 | CA | D0 | D9 | E3 | ED | F6 | FC |
| 1110 | FE | FC | F6 | ED | E3 | D9 | D0 | CA |
| 1111 | FE | FE | FE | FE | FE | FE | FE | FE |

Figure 5:
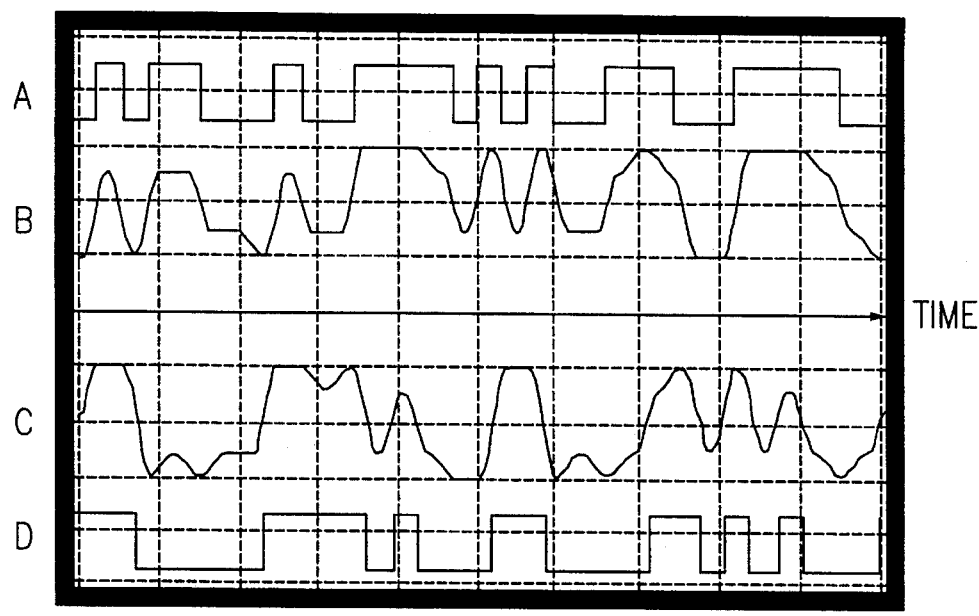
FIG. 5 is a time plot of illustrative waveforms produced in accordance with one embodiment of the present invention.

FIG. 5 shows time plots A–D illustrating waveforms produced by a first preferred embodiment of the present invention. FIG. 5 may be explained by reference to the particular embodiment shown in FIG. 1. Waveform A represents an exemplary I bit-stream 53. Waveform D represents an exemplary Q bit-stream 54. Waveforms B and C represent exemplary signals I(t) 70 and Q(t) 71, respectively, produced according to a first preferred embodiment of the present invention wherein the I-ROM 129 and the Q-ROM 139 each are programmed with the data listed in Table 3. For example, an $I_{digital}$ word "36" as shown in Table 3 is converted by DAC 149 into an $I_{analog}$ signal having a normalized value of –0.575 as shown in FIG. 5.

Figure 6:
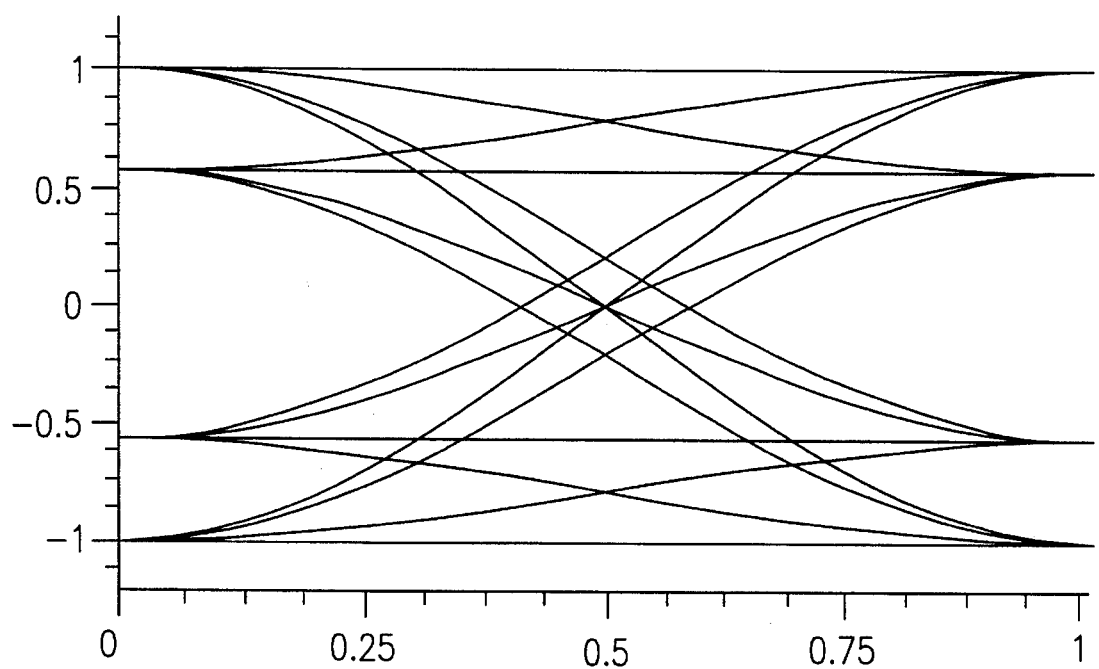
FIG. 6 is an "eye-diagram" of a baseband signal produced in accordance with one embodiment of the present invention.

FIG. 6 is an "eye-diagram" of the baseband digital signal I(t) 70 or Q(t) 71 produced when I-ROM 129 and Q-ROM 139 are programmed with the data listed in Table 3 according to a first preferred embodiment. An eye-diagram is a superimposed plot of the amplitude, versus time, of all possible baseband signals which would be produced at the output of an ideal receiver in a noise-free environment. As shown in FIG. 6, when a bit transition occurs, the zero-amplitude crossing point can occur at any of three different time points, depending upon the bit transition waveform which is realized from the sequences programmed into I-ROM 129 and Q-ROM 139.

FIG. 6 also reveals the shapes of the sixteen preselected bit transition waveforms produced when the data in Table 3 is stored in I-ROM 129 and Q-ROM 139. The sixteen waveforms comprise all possible combinations of transitions between the four possible bit amplitude values +1, +$\beta$, –$\beta$ and –1, where $\beta=0.575$ this particular embodiment. Four of the sixteen transition conditions (0000, 0011, 1100, 1111) produce constant amplitude bit transition waveforms.

Figure 7:
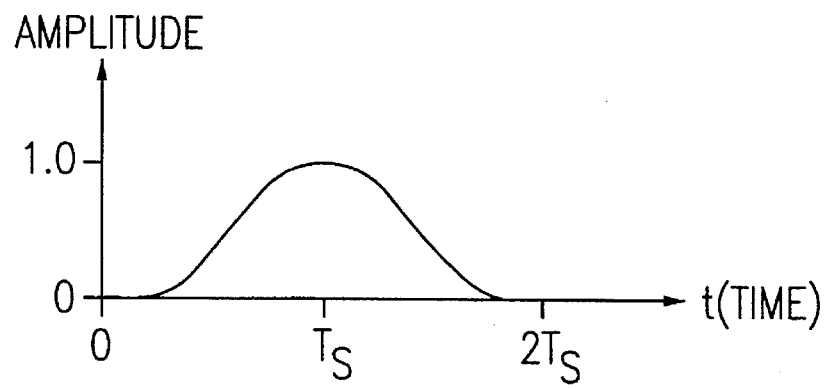
FIG. 7 is a plot of a baseband bit-shaping function employed in one embodiment of the present invention.

FIG. 7 shows a baseband bit-shaping function realized by programming I-ROM 129 and Q-ROM 139 with the data listed in Table 3. The waveform in FIG. 7 may be described as a double-interval raised-cosine response, as discussed above.

Figure 8:
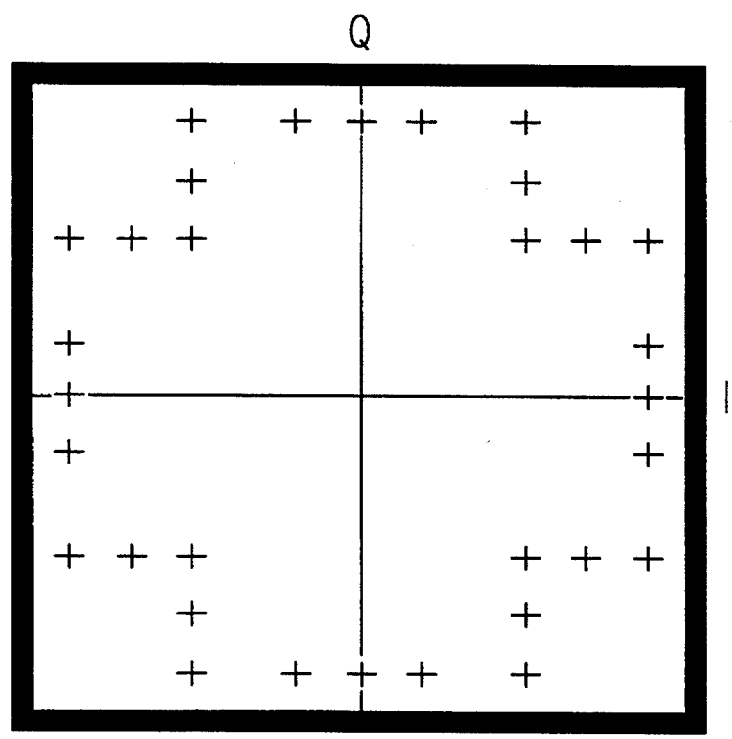
FIG. 8 is a signal space I-Q constellation diagram for the signal produced by one embodiment of the present invention.

FIG. 8 shows a signal space I-Q constellation for the I(t) 70 and Q(t) 71 signals produced by a systems embodiment wherein the data listed in Table 3 is programmed into I-ROM 129 AND Q-ROM 139.

Figure 9A:
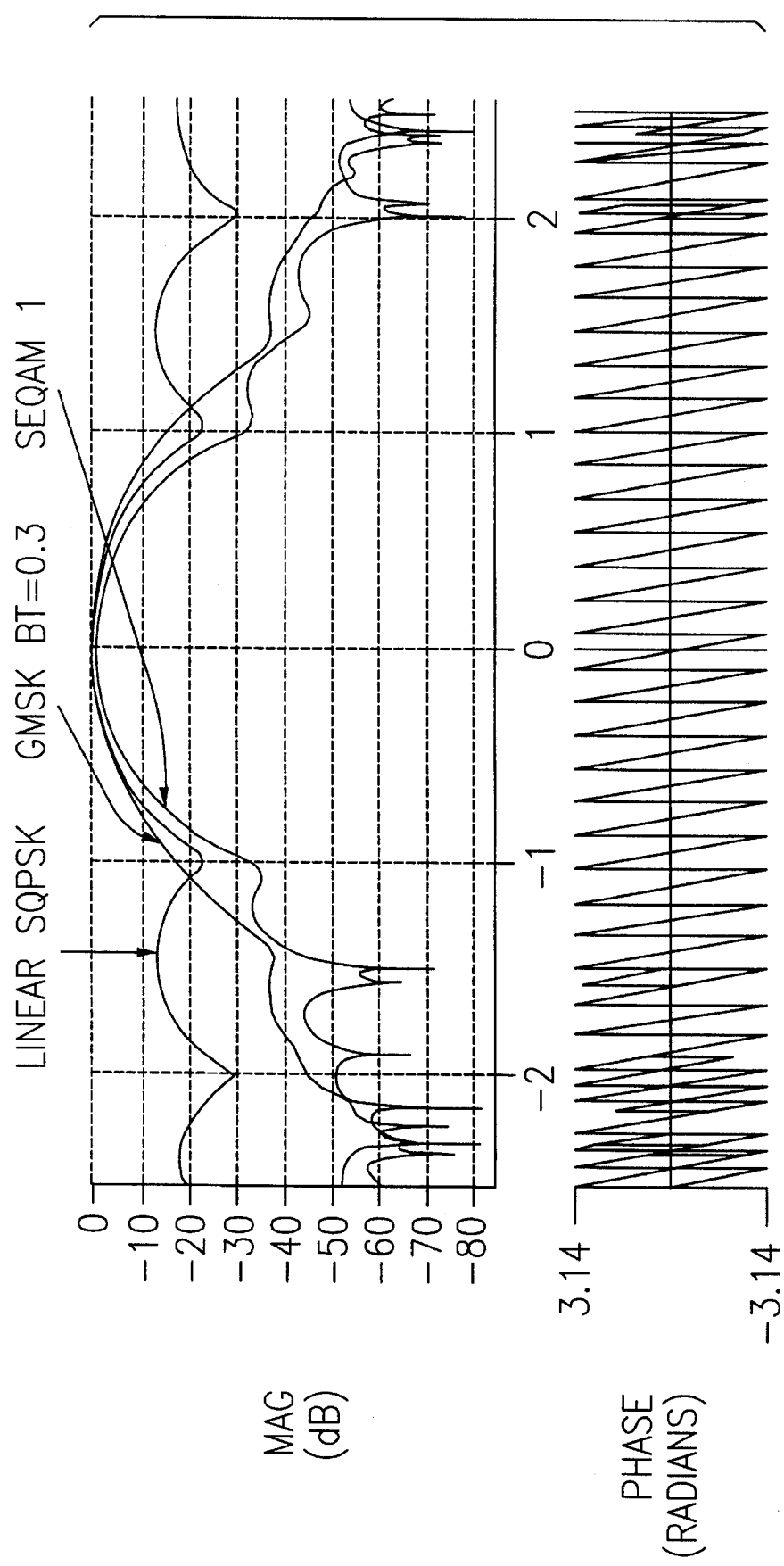
FIGS. 9A and 9B are graphs of the power spectra of the output signals produced by staggered QPSK, GMSK BT=0.3, and one embodiment of the present invention.

FIG. 9A is a plot comparing power spectra of a staggered QPSK (SQPSK) signal, an GMSK BT=0.3 signal, and the output signal of a first preferred embodiment of a spectrally efficient quadrature amplitude modulator according to the present invention. It may be observed that the SEQAM signal has a narrower main lobe than GMSK, while exhibiting lower first adjacent channel sidelobes than either SQPSK or MSK.

Figure 9B:
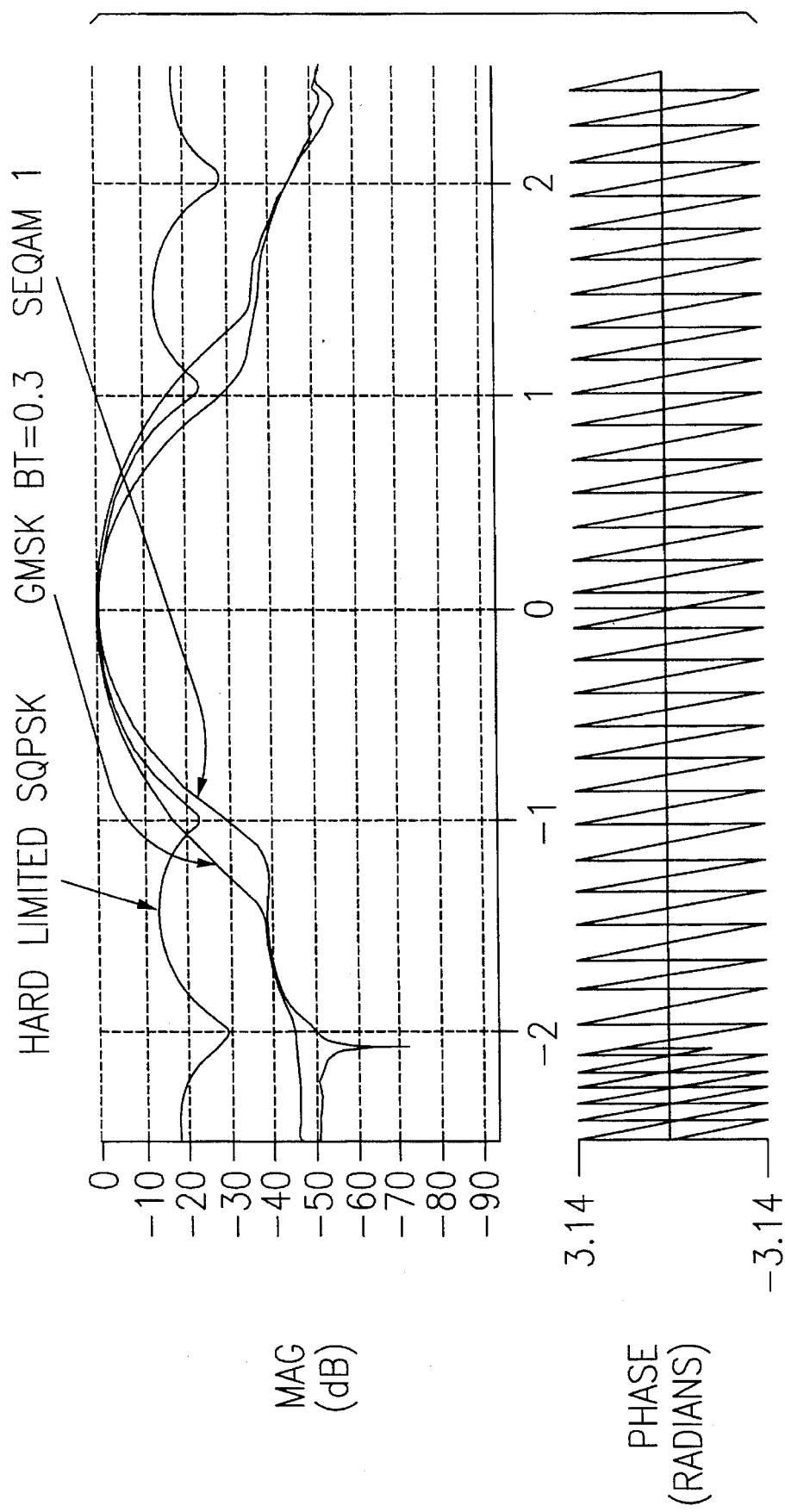

FIG. 9B is a plot comparing power spectra of an SQPSK signal, an GMSK BT=0.3 signal, and the output signal of a first preferred embodiment of a spectrally efficient quadrature amplitude modulator according to the present invention, after passing through a hard-limited channel. It is to be observed that the SEQAM signal experiences very little spectral regrowth as a result of the amplitude compression in the hard limiter.

In the second presently preferred embodiment, the I-ROM 129 and Q-ROM 139 each are programmed with the data listed in Table 4. A system embodiment incorporating ROM so programmed produces bit transition waveforms derived from a Blackman window bit shape with $\beta=0.800$ for I(t) 70 and Q(t) 71. This Blackman window function, $p_2(t)$, is defined as:

$$p_2(t)=0.42-0.5*\cos{(\pi t/T_b)}+0.08*\cos{(\pi t/T_b)} \text{ for } 0 \leq t \leq 2T_b$$

Figure 10:
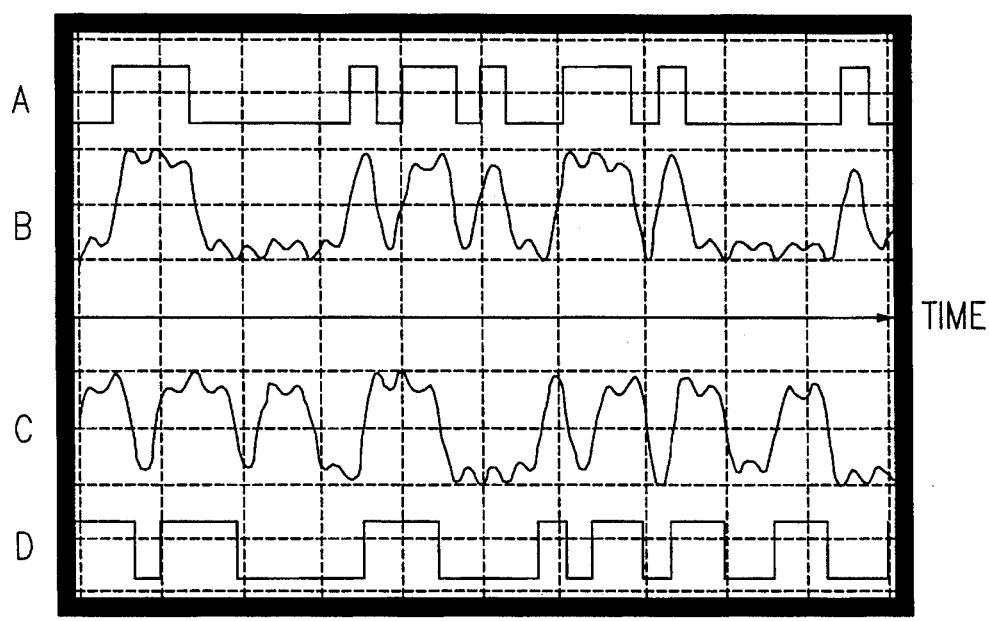
FIG. 10 is a time plot of illustrative waveforms produced by one embodiment of the present invention.

FIG. 10 shows time plots A–D illustrating waveforms produced by a second preferred embodiment of the present invention. FIG. 10 may be explained by reference to the particular embodiment shown in FIG. 1. Waveform A represents an exemplary I bit-stream 53. Waveform D represents an exemplary Q bit-stream 54. Waveforms B and C represent exemplary signals I(t) 70 and Q(t) 71, respectively, produced according to a second preferred embodiment of the present invention wherein the I-ROM 129 and the Q-ROM 139 each are programmed with the data listed in Table 4. For example, an $I_{digital}$ word "19" as shown in Table 4 is converted by DAC 149 into an $I_{analog}$ signal having a normalized value of –0.800 as shown in FIG. 5.

TABLE 4

| Four MSBs (Transition Conditions) | Three LSBs (clock signals) | | | | | | | |
|---|---|---|---|---|---|---|---|---|
| | 000 | 001 | 010 | 011 | 100 | 101 | 110 | 111 |
| 0000 | 19 | 1E | 2A | 35 | 3A | 35 | 2A | 1E |
| 0001 | 19 | 1E | 28 | 31 | 31 | 27 | 16 | 06 |
| 0010 | 00 | 06 | 16 | 27 | 31 | 31 | 28 | 1E |
| 0111 | 00 | 06 | 14 | 23 | 29 | 23 | 14 | 06 |
| 0100 | 19 | 21 | 37 | 58 | 7F | A6 | C7 | DD |
| 0101 | 19 | 22 | 39 | 5C | 88 | B4 | DA | F5 |
| 0110 | 00 | 09 | 24 | 4A | 76 | A2 | C5 | DC |
| 0111 | 00 | 0A | 25 | 4E | 7F | B0 | D9 | F4 |
| 1000 | E5 | DD | C7 | A6 | 7F | 58 | 37 | 21 |
| 1001 | E5 | DD | C7 | A6 | 7F | 58 | 37 | 21 |
| 1010 | FE | F5 | DA | B4 | 88 | 5C | 39 | 22 |

TABLE 4-continued

| Four MSBs (Transition Conditions) | Three LSBs (clock signals) | | | | | | |
|---|---|---|---|---|---|---|---|
| | 000 | 001 | 010 | 011 | 100 | 101 | 110 | 111 |
| 1011 | FE | F4 | D9 | B0 | 7F | 4E | 25 | 0A |
| 1100 | E5 | E0 | D4 | C9 | C4 | C9 | D4 | E0 |
| 1101 | E5 | E0 | D6 | CD | CD | D7 | E8 | F8 |
| 1110 | FE | F8 | E8 | D7 | CD | CD | D6 | E0 |
| 1111 | FE | F8 | EA | DB | D5 | DB | EA | F8 |

Figure 11:
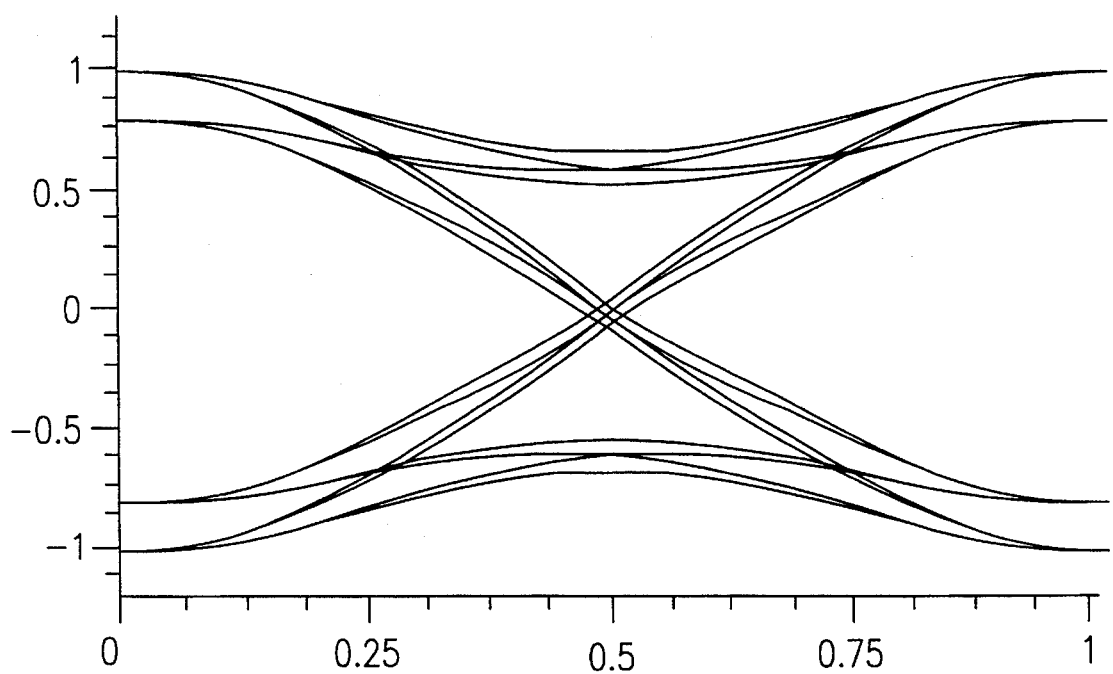
FIG. 11 is an "eye-diagram" of the baseband digital signal produced by a second embodiment of the present invention.

FIG. 11 is an eye-diagram of the baseband digital signals I(t) 70 and Q(t) 71 produced when I-ROM 129 and Q-ROM 139 are programmed with the data listed in Table 4 according to a second preferred embodiment. As shown in FIG. 11, when a bit transition occurs, the zero-amplitude crossing point can occur at any of three different time points, depending upon the bit transition waveform which is realized from the sequences programmed into I-ROM 129 and Q-ROM 139.

FIG. 11 also reveals the shapes of the sixteen preselected bit transition waveforms produced when the data in Table 4 is stored in I-ROM 129 and Q-ROM 139. The sixteen waveforms comprise all possible combinations of transitions between the four possible bit amplitude values +1, +β, −β and −1, where β=0.800 for this particular embodiment.

Figure 12:
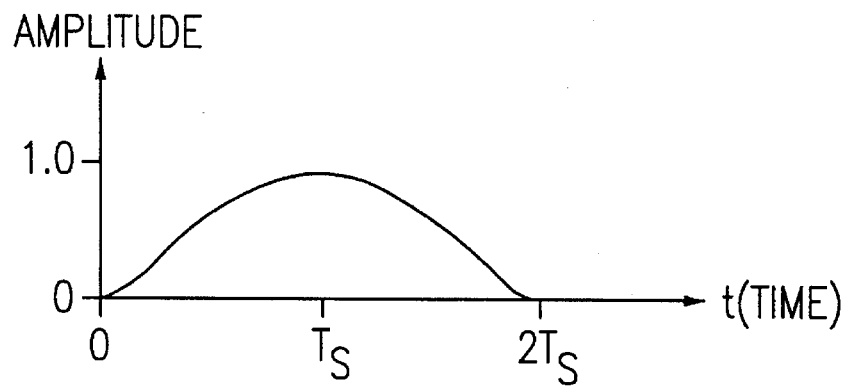
FIG. 12 is a plot of a baseband bit-shaping function employed a second embodiment of the present invention.

FIG. 12 shows a baseband bit-shaping function realized by programming I-ROM 129 and Q-ROM 139 with the data listed in Table 4. The waveform in FIG. 12 may be described as a Blackman window response, as discussed above.

Figure 13:
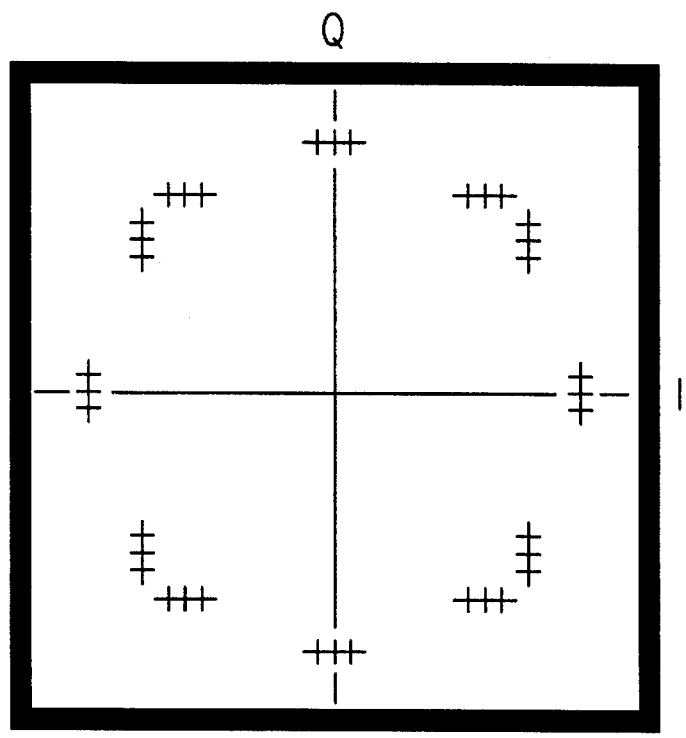
FIG. 13 is a signal space I-Q constellation diagram for the signal produced by a second embodiment of the present invention.

FIG. 13 shows a signal space I-Q constellation for the I(t) 70 and Q(t) 71 signals produced by a system embodiment wherein the data listed in Table 4 is programmed into I-ROM 129 and Q-ROM 139.

Figure 14A:
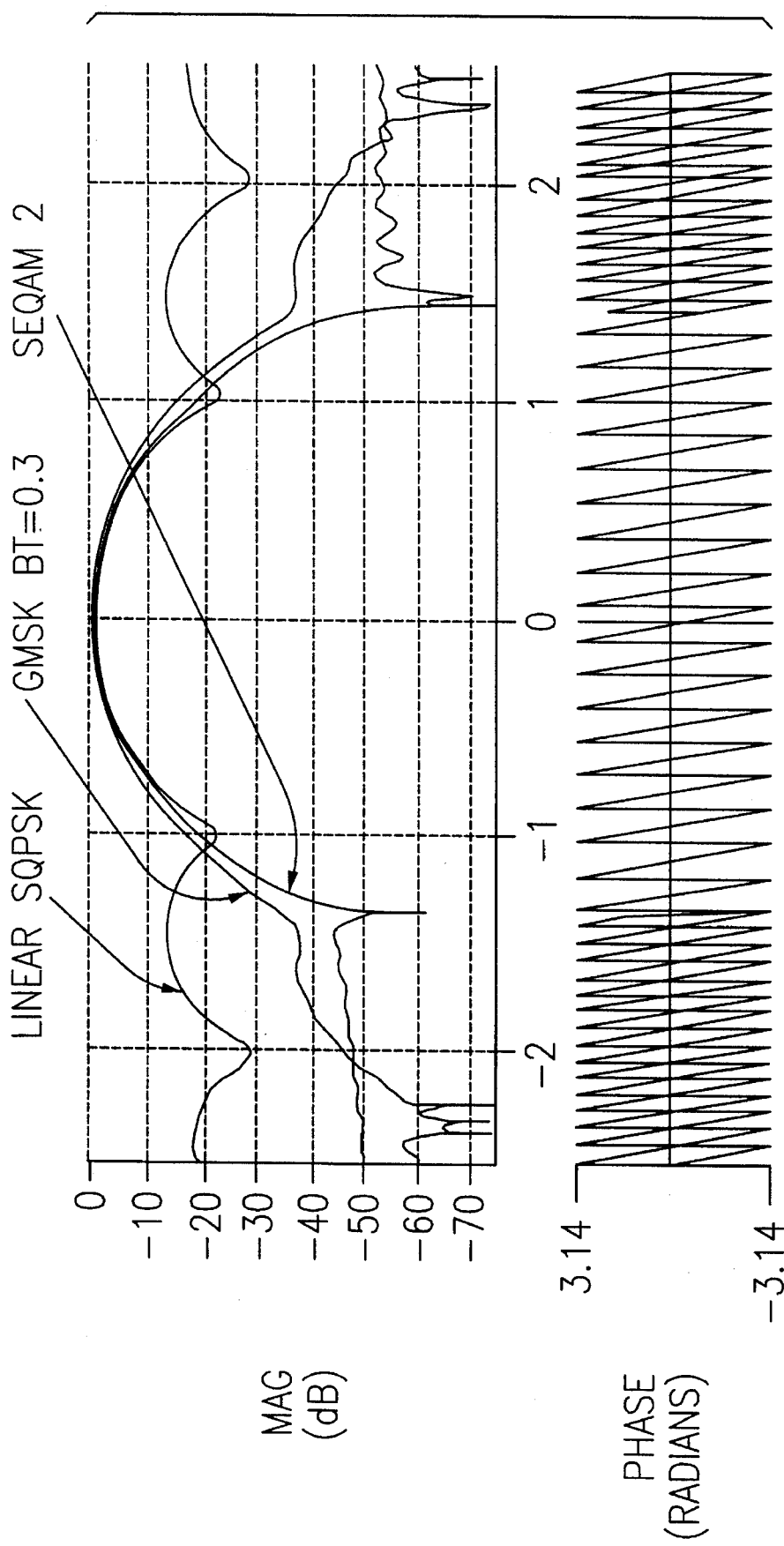
FIGS. 14A and 14B are graphs of the power spectra of the output signals produced by staggered QPSK, GMSK BT=0.3, and a second embodiment of the present invention.

FIG. 14A is a plot comparing power spectra of a staggered QPSK (SQPSK) signal, an GMSK BT=0.3 signal, and the output signal of a first preferred embodiment of a spectrally efficient quadrature amplitude modulator according to the present invention. It may be observed that the SEQAM signal has a narrower main lobe than GMSK, while exhibiting lower first adjacent channel sidelobes than either SQPSK or GMSK.

Figure 14B:
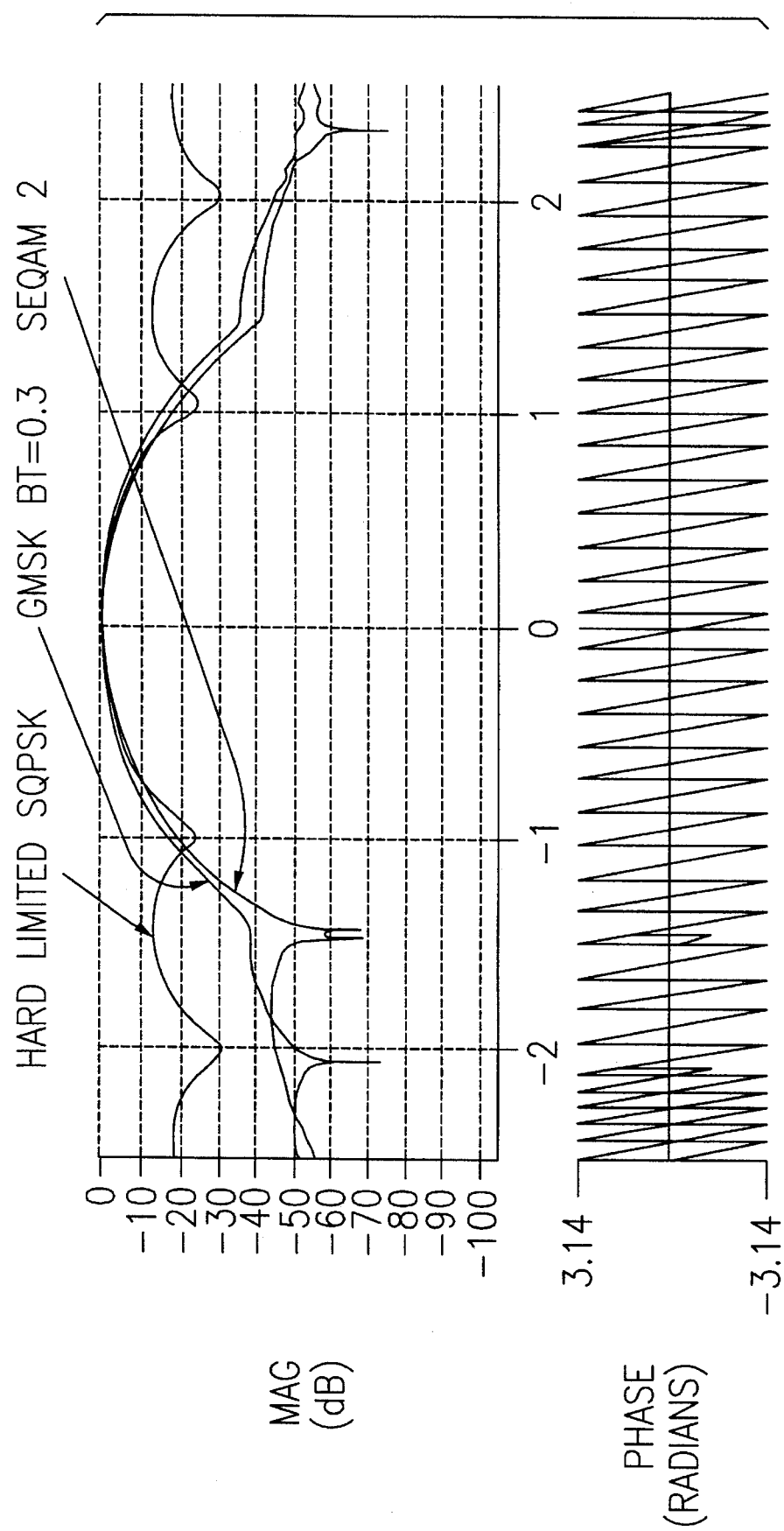

FIG. 14B is a plot comparing power spectra of an SQPSK signal, an MSK signal, and the output signal of a first preferred embodiment of a spectrally efficient quadrature amplitude modulator according to the present invention, after passing through a hard-limited channel. It is to be observed that the SEQAM signal experiences very little spectral regrowth as a result of the amplitude compression in the hard limiter.

Embodiments and other aspects of the invention described herein, including the system embodiments described below, may be made or used in conjunctions with inventions described, in whole or in part, in U.S. patent application Ser. No. 08/304,091 filed Sep. 9, 1994 in the name of inventors Randy Durrant and Mark Burback entitled "Coherent and Noncoherent CPM Correlation Method and Apparatus," which is incorporated by reference as if fully set forth herein.

Figure 15:
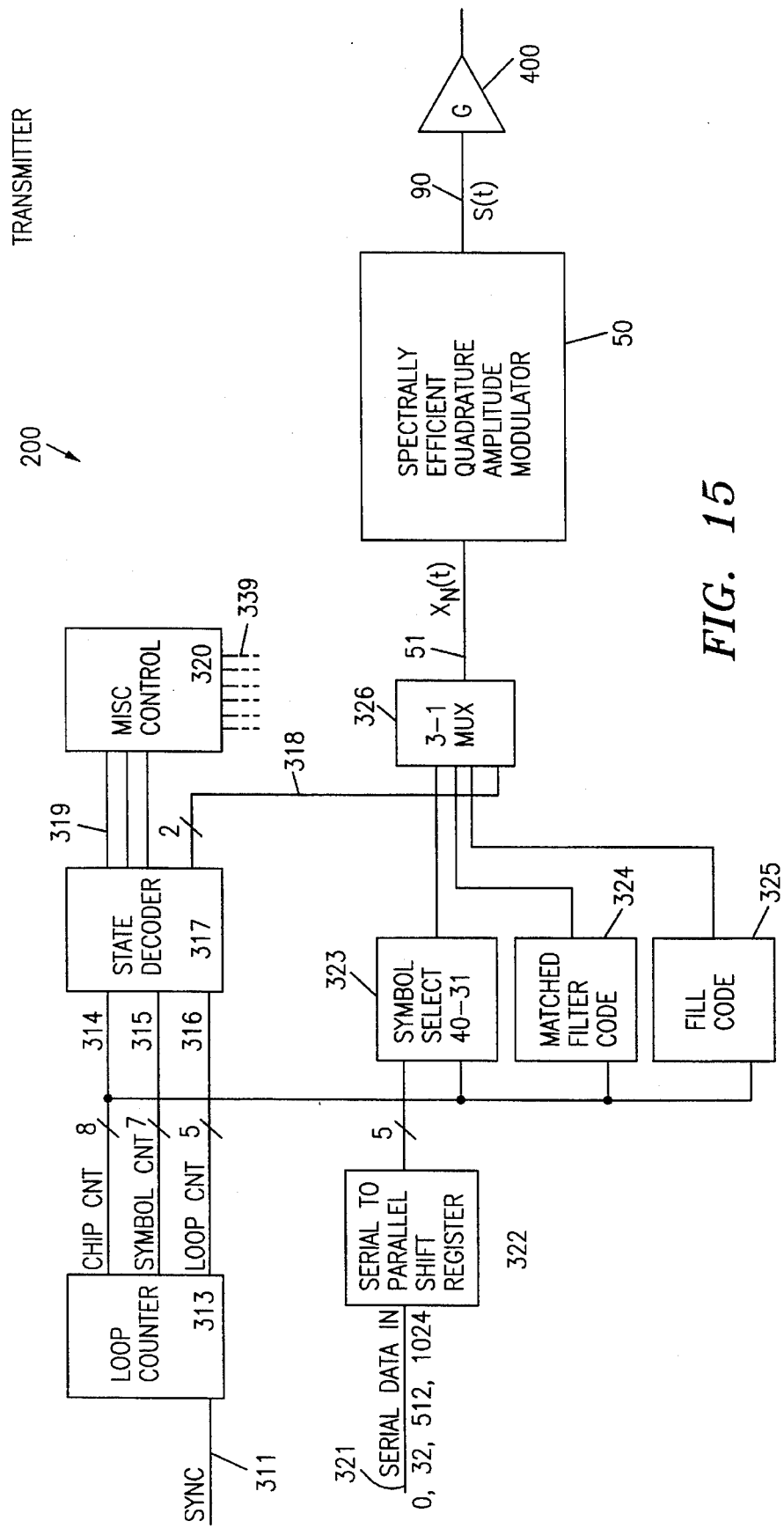
FIG. 15 is a block diagram of a preferred spread spectrum transmitter used in conjunction with a spectrally efficient quadrature amplitude modulator according to an embodiment of the present invention.

FIG. 15 is a block diagram of a preferred spread spectrum transmitter incorporating a baseband signal processor and quadra-phase modulator.

In a preferred embodiment, a spread spectrum transmitter 200 incorporates a spectrally efficient quadrature amplitude modulator 50. The transmitter 200 may be associated with either a base station or a user station in a cellular radio environment. In a preferred embodiment, the transmitter 200 operates according to an over-the-air communication protocol in which time-division duplexing is employed. Other and further details regarding a preferred over-the-air communication protocol may be found in the following applications, which are incorporated by reference as if fully set forth herein: U.S. patent application Ser. No. 08/161,187 filed Dec. 3, 1993 in the name of inventors Robert C. Dixon and Jeffrey S. Vanderpool, entitled "Method and Apparatus for Establishing Spread Spectrum Communication;" U.S. patent application Ser. No. 08/215,306, filed Mar. 21, 1994 and U.S. patent application Ser. No. 08/284,053 filed Aug. 1, 1994, both of which are filed in the name of inventors Gary B. Anderson, Ryan N. Jensen, Bryan K. Petch, and Peter O. Peterson, and are entitled "PCS Pocket-Phone/Microcell Communication Over-Air Protocol."

However, the present invention will operate in a variety of communication environments and according to a variety of different communication protocols, whether or not time-division duplexing is employed.

Figure 16:
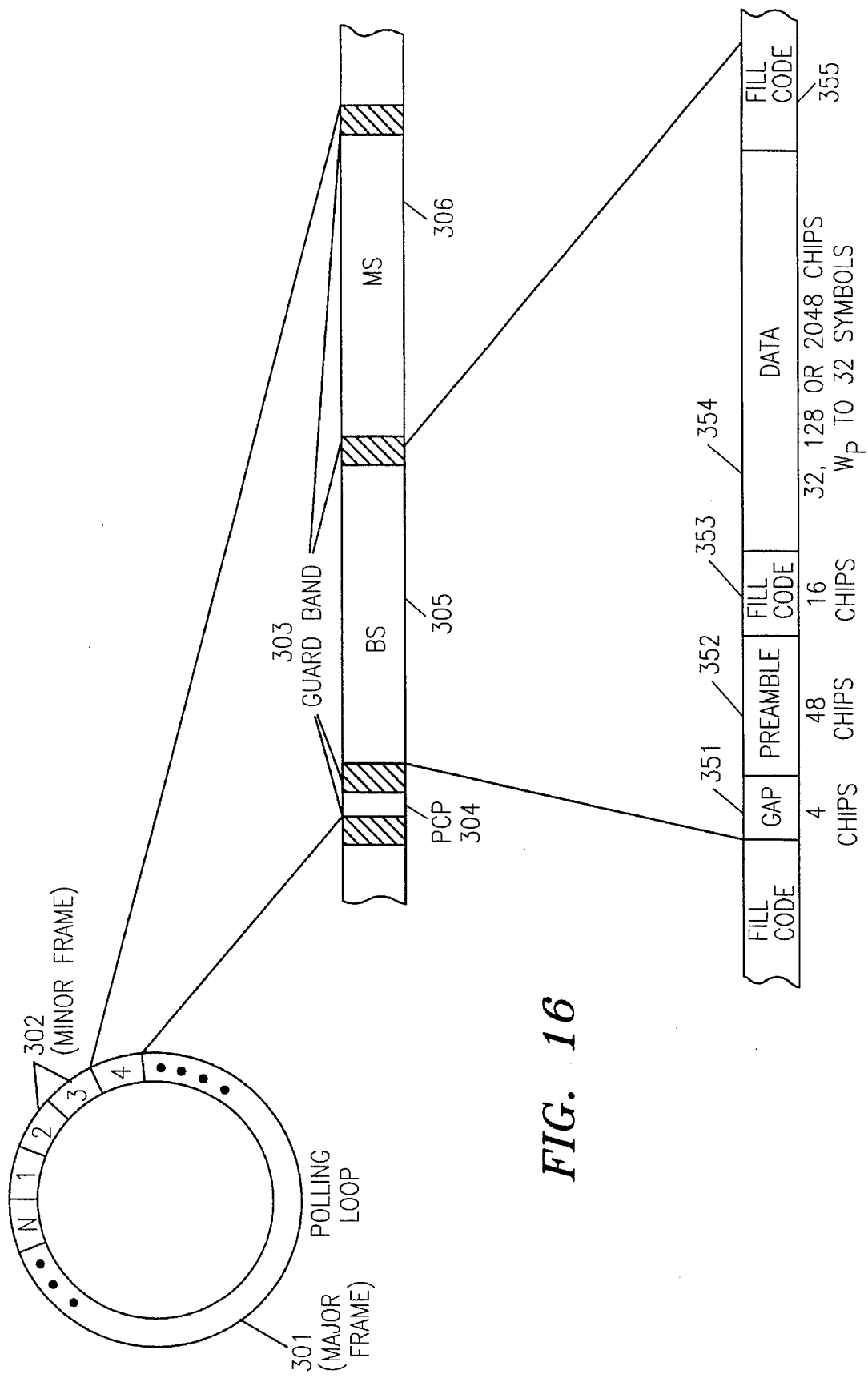
FIG. 16 is a diagram of a preferred transmission protocol incorporating spectrally efficient quadrature amplitude modulated signals according to the present invention.

In a preferred communication protocol, shown in FIG. 16, a polling loop 301 ("major frame") comprises a plurality of time slots 302 ("minor frames"). Each minor frame 302 preferably comprises communication between a base station (e.g., cellular station) and a user station (e.g., mobile user) in time division duplex—that is, the base station transmits to a user station and the user station transmits back to the base station within the same minor frame 302.

More specifically, as shown in an exploded view in FIG. 16, a minor frame 302 preferably comprises a power control pulse transmission 304 from the user station to the base station, a base station transmission 305, and a user station transmission 306, each of which is surrounded by guard bands 303. Details regarding the power control pulse transmission 304 may be found in application Ser. No. 08/284, 053. The base station transmission 305 and the user station transmission 306 have a similar structure; thus, the following description regarding the base station transmission 305 applies equally to the user station transmission 306.

An exploded view of a base station transmission 305 is shown in FIG. 16. The base station transmission 305 comprises an interframe gap 351, a matched filter code 352, a first fill code 353, a data sequence 354, and a second fill code 355 similar to the first fill code 353. The interframe gap 351 may be four chips in duration; the matched filter code 352 may be 48 chips in duration; the first fill code 353 may be 16 chips in duration; the data sequence 354 may be comprised of one or more symbol codes, each of which may be 32 chips, 128 chips, 2048 chips, or some other number of chips in duration depending upon a data rate for transmission between the base station and the user station; and the second fill code 355 may be a sufficient number of chips in duration to complete the minor frame 302. A plurality of minor frames 302 may comprise a channel.

In a preferred embodiment, the fill codes 353, 355 each comprise a code that has a low cross-correlation with each of the symbol codes, and may form a repeated pattern such as "0 1 0 1 . . . " or "0 0 1 1 . . . ". The interframe gap 351 may have the same code as one or both of the fill codes 353, 355. The fill codes 353, 355 are generated primarily for the purpose of starting the modulator in a known state at the beginning of a transmission, and to avoid having to turn the transmitter off and on for the time period while the fill code 305 is transmitted. Further, the fill codes 353, 355 may be selected to improve the spectral characteristics of the overall transmission.

The spread spectrum transmitter 200 of FIG. 15 is a preferred means for generating a base station transmission 305 (or user station transmission 306) according to the above description using SEQAM as described elsewhere herein. A serial data stream 321 of information to be transmitted is provided to the transmitter 200 and converted to parallel data by a serial-to-parallel shift register 322. The parallel data output by the serial-to-parallel shift register 322 is used to select from among a plurality of symbol codes stored in a symbol code table 323. Each symbol code, as mentioned, is preferably 32 chips in length and represents a predetermined number of data bits (preferably 5 data bits) from the serial data stream 321.

In addition to storing various symbol codes in the symbol code table 323, the transmitter also comprises a matched filter code generator 324 capable of generating a matched filter code 352, and a fill code generator 325 (which may be a table) capable of generating fill codes 353, 355. The symbol code table 323, matched filter code generator 324, and fill code generator 325 are selectively accessed by a control circuit 320 for constructing a transmission such as a base station transmission 305 or user station transmission 306. A transmission may be constructed, for example, by concatenating or appending consecutive symbol codes, fill codes, and other code sequences as necessary to generate the appropriate chip sequence. Although connections are not expressly shown, the control circuit 320 has control outputs 339 connected to various parts of the circuit for the purpose of exercising synchronous control.

In a preferred embodiment, a 5 MHz clock signal 311 is coupled to a loop counter 313, which, among other things, counts chips over the course of each minor frame 302. The loop counter 313 produces a chip count signal 314, a symbol count signal 315, and a channel count signal 316. The channel or loop count signal 316 indicates which minor frame 302 is active within the polling loop 301. Thus, if there are 32 minor frames 302 in a polling loop 301, the channel count signal 316 counts from 0 to 31 and then resets. When the channel count signal 316 indicates an active minor frame 302 in which the transmitter 200 is authorized to transmit, the control circuit 320 may issue commands to transmit information at the appropriate time.

The symbol count signal 315 keeps track of how many symbols have been transmitted by the transmitter 200 in the data sequence 354. Thus, if the transmitter is to transmit 16 consecutive symbols as part of the data sequence 354, then the symbol count signal 315 counts from 0 to 15 and then resets.

The chip count signal 314 keeps track of the number of chips that have been transmitted by the transmitter 200 for the current symbol in the data sequence 354. Thus, if each symbol code is 32 chips in length, the chip count signal 314 counts from 0 to 31 and then resets. The chip count signal 314 also provides timing information for those circuits in the transmitter which are clocked at each chip time $T_c$.

The chip count signal 314, the symbol count signal 315, and the channel count signal 316 are coupled to a state decoder 317, which determines whether the current chip is part of the matched filter code 352, the fill code 305, or a data sequence symbol code 306, and which generates a selection signal 318 and a set of control signals 319. The control signals 319 are coupled to a control circuit 320.

As mentioned, a serial data stream 321 of data to be transmitted is coupled to a serial-to-parallel shift register 322, which converts the serial data stream 321 to a sequence of 5-bit parallel symbols. The sequence of symbols is coupled to an input of a symbol code table 323, which selects for each symbol a specific symbol code unique to the symbol.

The chip count signal 314 is coupled to the symbol code table 323, the matched filter code generator 324, and the fill code generator 325. Outputs of the symbol code table 323, the matched filter code generator 324, and the fill code generator 325 are coupled to inputs of a 3-1 multiplexer 326. A control input of the 3-1 multiplexer 326 is coupled to the selection signal 318 from the control circuit 320. The 3-1 multiplexer 326 thus generates a serial bit-stream signal $x_N(t)$ 51 in accordance with commands from control circuit 320. Specifically, the control circuit 320 may select a fill code to fill the interframe gap 351 from the fill code generator 325, a matched filter code 352 from the matched filter code generator 324, a first fill code 353 from the fill code generator 325, one or more symbol codes (depending on the amount of data to be transmitted and the data rate) corresponding to the data sequence 354 from the symbol code table 323, and a second fill code 355 from the fill code generator 325, in order to construct a transmission such as a base station transmission 305 or a user station transmission 306.

As illustrated in FIG. 15, the serial bit-stream signal $x_N(t)$ 51 is coupled to spectrally efficient quadrature amplitude modulator 50. Modulator 50 produces a SEQAM signal S(t) 90 which is coupled to HPA 400. HPA 400 amplifies the signal for transmission over a communication channel.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A signal processor comprising:

a demultiplexor connected to a serial bit-stream, producing an I bit-stream and a Q bit-stream, said Q bit-stream staggered in time by one-half of a bit interval with respect to said I bit-stream, a first set of latches connected to said I and Q bit-streams, producing first signals representing a current transition state of said I bit-stream along with previous and upcoming transition states of said Q bit-stream, a second set of latches connected to said I and Q bit-streams, producing second signals representing a current transition state of said Q bit-stream along with previous and upcoming transition states of said I bit-stream, a first memory device connected to said first signals representing a current transition state of said I bit-stream along with previous and upcoming transition states of said Q bit-stream, producing an n-bit $I_{digital}$ signal representing a bit transition waveform for said I bit-stream, a second memory device connected to said second signals representing a current transition state of said Q bit-stream along with previous and upcoming transition states of said I bit-stream, producing an n-bit $Q_{digital}$ signal representing a bit transition waveform for said Q bit-stream, a first digital-to-analog converter connected to said $I_{digital}$ signal, producing an analog I signal, a second digital-to-analog converter connected to said $Q_{digital}$ signal, producing an analog Q signal.

2. A quadrature amplitude modulator comprising a signal processor comprising a demultiplexor coupled to a serial bit stream, producing an I bit-stream and a Q bit-stream, said Q bit-stream staggered in time by one-half of a bit interval with respect to said I bit-stream, a first set of latches coupled to said I and Q bit-streams, producing first signals representing a current transition state of said I bit-stream along with previous and upcoming transition states of said Q bit-stream, a second set of latches coupled to said I and Q bit-streams, producing second signals representing a current transition state of the Q bit-stream along with previous and upcoming transition states of the I bit-stream, a first memory device coupled to said first signals representing a current transition state of said I bit-stream along with previous and upcoming transition states of said Q bit-stream, producing an n-bit $I_{digital}$ signal representing a bit transition waveform for said I bit-stream, a second memory device coupled to said second signals representing a current transition state of said Q bit-stream along with previous and upcoming transition states of said I bit-stream, producing an n-bit $Q_{digital}$ signal representing a bit transition waveform for said Q bit-stream, a first digital-to-analog converter coupled to said $I_{digital}$ signal, producing an analog I signal, a second digital-to-analog converter coupled to said $Q_{digital}$ signal, producing an analog Q signal, a first modulator coupled to a first sinusoidal carrier, having a frequency $w_o t$, and further coupled to said analog I signal, producing a first modulated carrier, a second modulator coupled to a second sinusoidal carrier, having a frequency $w_o t$ and offset in phase from said first carrier by 990 degrees, and further coupled to said analog Q signal, producing a second modulated carrier, and a summer coupled to said first and second modulated carriers, producing a quadrature modulated output signal.

3. A method of quadrature amplitude modulation comprising the steps of:

dividing a serial bit-stream into an I bit-stream and a Q bit-stream, applying said I bit-stream to a first memory device which stores digital data representing bit transition waveforms for said I bit-stream, applying said Q bit-stream to a second memory device which stores digital data representing bit transition waveforms for said Q bit-stream, retrieving from said first memory device first digital data representing a bit transition waveform for said I bit-stream, retrieving from said second memory device second digital data representing a bit transition waveform for said I bit-stream, converting said first digital data into an analog I signal, converting said second digital data into an analog Q signal, modulating a first sinusoidal carrier, having a frequency $w_o t$, with said analog I signal to produce a first modulated carrier, modulating a second sinusoidal carrier, having a frequency $w_o t$ and offset in phase from said first carrier by 90 degrees, with said analog Q signal to produce a second modulated carrier, and combining said modulated first and second carriers.

4. A signal processor comprising:

a demultiplexer connected to a serial bit-stream, producing an I bit-stream and a Q bit-stream, each of said I and Q bit-streams comprising a plurality of bits having an amplitude normalized to 1, means for staggering said I and Q bit-streams in time with respect to each other by one-half of a bit period, means for selectively suppressing the amplitude of a bit in the I bit-stream to β whenever preceding and succeeding bits in the Q bit-stream have the same value as each other, and means for selectively suppressing the amplitude of a bit in the Q bit-stream to β whenever preceding and succeeding bits in the I bit-stream have the same value as each other.

5. The signal processor of claim 4 further comprising a first bit-shaping means for shaping a bit in the I bit-stream and a second bit-shaping means for shaping a bit in the Q bit-stream.

6. The signal processor of claim 5 wherein said first bit-shaping means and said second bit-shaping means each provide a bit in the shape of a double-interval raised cosine.

7. The signal processor of claim 6 wherein β is approximately 0.575.

8. The signal processor of claim 5 wherein said first bit-shaping means and said second bit-shaping means each provide a bit in the shape of a Blackman window.

9. The signal processor of claim 8 wherein β is approximately 0.8.

10. A quadrature amplitude modulator comprising a signal processor comprising a demultiplexor coupled to a serial bit stream, producing an I bit-stream and a Q bit-stream, each of said I and Q bit-streams comprising a plurality of bits having an amplitude normalized to 1, means for staggering said I and Q bit-streams in time with respect to each other by one-half of a bit period, means for selectively suppressing the amplitude of a bit in said I bit-stream to beta whenever preceding and succeeding bits in said Q bit-stream have the same value as each other, means for selectively suppressing the amplitude of a bit in said Q bit-stream to beta whenever preceding and succeeding bits in said I bit-stream have the same value, a first modulator for modulating a first sinusoidal carrier, having a frequency $w_o t$, with said I bit-stream to produce a first modulated carrier, a second modulator for modulating a second sinusoidal carrier, said second carrier having a frequency $w_o t$ offset in phase from said first carrier by 90 degrees, with said Q bit-stream to produce a second modulated carrier, and a summer for combining said modulated first and second carriers.

11. The quadrature amplitude modulator of claim 10, further comprising a first bit-shaping means for shaping the bits in the I bit-stream and second bit-shaping means for shaping the bits in the Q bit-stream.

12. The quadrature amplitude modulator of claim 11, wherein said first bit-shaping means and said second bit-shaping means each provide a bit in the shape of a double-interval raised cosine.

13. The quadrature amplitude modulator of claim 12, wherein β is approximately 0.575.

14. The quadrature amplitude modulator of claim 11, wherein said first bit-shaping means and said second bit-shaping means each provide a bit in the shape of a Blackman window.

15. The quadrature amplitude modulator of claim 14, wherein β is approximately 0.8.

16. A spread spectrum transmitter comprising the quadrature amplitude modulator of claim 10, further comprising:

a plurality of tables for storing chip sequences, a multiplexer for selecting a plurality of transmission chip sequences from the plurality of tables, and means for combining said plurality of chip sequences into the serial bit-stream to be provided to said quadrature amplitude modulator.

17. A method of processing a serial bit-stream comprising the steps of:

dividing said serial bit-stream into an I bit-stream and a Q bit-stream, each of said I and Q bit-streams comprising bits having a normalized amplitude of 1, staggering the I and Q shifted bit-streams in time with respect to each other by one-half of a bit period, selectively suppressing the amplitude of bits in the I bit-stream to β whenever preceding and succeeding bits in the Q bit-stream have the same value as each other, and selectively suppressing the amplitude of bits in the Q bit-stream to β whenever preceding and succeeding bits in the I bit-stream have the same value as each other.

18. The method of claim 17, further comprising the steps of:

shaping the bits of the I bit-stream according to a first bit-shaping function, and shaping the bits of the Q bit-stream according to a second bit-shaping function.

19. The method of claim 18, wherein said first and second bit-shaping functions each are double-interval raised cosine functions.

20. The method of claim 18, wherein said first and second bit-shaping functions each are Blackman window functions.

* * * * *